US008447234B2

(12) United States Patent
Cook et al.

(10) Patent No.: US 8,447,234 B2
(45) Date of Patent: May 21, 2013

(54) METHOD AND SYSTEM FOR POWERING AN ELECTRONIC DEVICE VIA A WIRELESS LINK

(75) Inventors: Nigel P. Cook, El Cajon, CA (US); Richard C. Levine, Dallas, TX (US)

(73) Assignee: Qualcomm Incorporated, San Diego, CA (US)

( * ) Notice: Subject to any disclaimer, the term of this patent is extended or adjusted under 35 U.S.C. 154(b) by 987 days.

(21) Appl. No.: 11/408,793

(22) Filed: Apr. 21, 2006

(65) Prior Publication Data

US 2007/0178945 A1    Aug. 2, 2007

Related U.S. Application Data

(60) Provisional application No. 60/760,064, filed on Jan. 18, 2006.

(51) Int. Cl.
*H04B 7/00* (2006.01)

(52) U.S. Cl.
USPC ..... 455/41.2; 455/41.1; 455/41.3; 455/343.2; 455/571; 455/572

(58) Field of Classification Search
CPC ........................................................ H04B 5/00
USPC ................... 455/41.1, 41.2, 41.3, 343.2, 571, 455/572, 573, 574; 320/108, 104, 109
See application file for complete search history.

(56) References Cited

U.S. PATENT DOCUMENTS

| | | | |
|---|---|---|---|
| 3,098,971 A | 7/1963 | Richardson | |
| 3,480,229 A | 11/1969 | Entremont | |
| 3,588,905 A | 6/1971 | Dunlavy, Jr. | |
| 3,675,108 A | 7/1972 | Nicholl | |
| 3,918,062 A | 11/1975 | Haruki et al. | |
| 3,938,018 A | 2/1976 | Dahl | |
| 3,999,185 A | 12/1976 | Polgar, Jr. et al. | |
| 4,088,999 A | 5/1978 | Fletcher et al. | |
| 4,388,524 A | 6/1983 | Walton | |
| 4,390,924 A | 6/1983 | Nebiker, Jr. | |
| 4,473,825 A | 9/1984 | Walton | |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

Harrist, Wireless battery charging system using radio frequency energy harvesting, Master of Science Thesis, University of Pittsburgh, 2004.

(Continued)

*Primary Examiner* — Sanh D Phu
(74) *Attorney, Agent, or Firm* — Knobbe Martens Olson & Bear LLP

(57) ABSTRACT

A method and system for providing power to a chargeable device via radio frequency link are provided. In one aspect, a method of providing power to a chargeable device via radio frequency link comprises generating a substantially unmodulated signal. The method further comprises radiating a substantially unmodulated radio frequency (RF) signal to the chargeable device via a transmit antenna based on the substantially unmodulated signal. The method further comprises powering or charging the chargeable device with power delivered by the substantially unmodulated RF signal.

68 Claims, 10 Drawing Sheets

U.S. PATENT DOCUMENTS

| | | | |
|---|---|---|---|
| 4,524,411 A | 6/1985 | Willis | |
| 4,760,394 A | 7/1988 | Takeuchi et al. | |
| 4,914,539 A | 4/1990 | Turner et al. | |
| 4,959,568 A | 9/1990 | Stokes | |
| 4,959,764 A | 9/1990 | Bassett | |
| 5,027,709 A | 7/1991 | Slagle | |
| 5,072,233 A | 12/1991 | Zanzig | |
| 5,153,583 A | 10/1992 | Murdoch | |
| 5,175,561 A | 12/1992 | Goto | |
| 5,387,818 A | 2/1995 | Leibowitz | |
| 5,396,538 A | 3/1995 | Hong | |
| 5,397,962 A | 3/1995 | Moslehi | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,596,567 A | 1/1997 | deMuro et al. | |
| 5,608,417 A | 3/1997 | de Vall | |
| 5,621,322 A | 4/1997 | Ehnholm | |
| 5,654,621 A | 8/1997 | Seelig | |
| 5,684,828 A | 11/1997 | Bolan et al. | |
| 5,734,255 A | 3/1998 | Thompson et al. | |
| 5,767,601 A | 6/1998 | Uchiyama | |
| 5,771,165 A | 6/1998 | Couture et al. | |
| 5,796,240 A | 8/1998 | Saito et al. | |
| 5,821,638 A | 10/1998 | Boys et al. | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A | 11/1999 | Vetorino et al. | |
| 5,982,139 A | 11/1999 | Parise | |
| 5,991,665 A | 11/1999 | Wang et al. | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A | 8/2000 | Hill et al. | |
| 6,114,834 A | 9/2000 | Parise | |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 | 9/2001 | Cefo | |
| 6,317,338 B1 | 11/2001 | Boys | |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 | 8/2002 | Hanaki | |
| 6,507,152 B2 | 1/2003 | Matsumoto et al. | |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 | 4/2005 | Long | |
| 6,891,287 B2 | 5/2005 | Moret | |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 * | 11/2005 | Landis | 320/101 |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 | 10/2006 | Strobl | |
| 7,154,451 B1 | 12/2006 | Sievenpiper | |
| 7,164,344 B2 | 1/2007 | Deguchi et al. | |
| 7,167,139 B2 * | 1/2007 | Kim et al. | 343/785 |
| 7,180,265 B2 | 2/2007 | Naskali et al. | |
| 7,180,291 B2 | 2/2007 | Chmielewski et al. | |
| 7,209,792 B1 | 4/2007 | Parramon et al. | |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,518,267 B2 | 4/2009 | Baarman | |
| 7,525,283 B2 | 4/2009 | Cheng et al. | |
| 7,554,316 B2 | 6/2009 | Stevens et al. | |
| 7,598,646 B2 | 10/2009 | Cleveland | |
| 7,675,197 B2 | 3/2010 | Tetlow | |
| 7,676,263 B2 | 3/2010 | Harris et al. | |
| 7,688,036 B2 | 3/2010 | Yarger et al. | |
| 7,755,552 B2 | 7/2010 | Schantz et al. | |
| 7,760,151 B2 | 7/2010 | Poilasne et al. | |
| 7,777,396 B2 | 8/2010 | Rastegar et al. | |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 | 2/2011 | Lee | |
| 8,055,310 B2 | 11/2011 | Beart et al. | |
| 8,159,412 B2 | 4/2012 | Yun et al. | |
| 8,169,185 B2 | 5/2012 | Partovi et al. | |
| 2001/0012208 A1 | 8/2001 | Boys | |
| 2001/0026244 A1 | 10/2001 | Ieda et al. | |
| 2001/0029167 A1 | 10/2001 | Takeda et al. | |
| 2002/0017979 A1 | 2/2002 | Krause et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0160722 A1 | 10/2002 | Terranova et al. | |
| 2002/0190908 A1 * | 12/2002 | Andrews et al. | 343/726 |
| 2003/0090353 A1 | 5/2003 | Robinson et al. | |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1 | 10/2003 | Mickle et al. | |
| 2003/0203733 A1 | 10/2003 | Sharon | |
| 2003/0214961 A1 | 11/2003 | Nevo et al. | |
| 2004/0001029 A1 | 1/2004 | Parsche et al. | |
| 2004/0130425 A1 | 7/2004 | Dayan et al. | |
| 2004/0134985 A1 | 7/2004 | Deguchi et al. | |
| 2004/0150521 A1 | 8/2004 | Stilp | |
| 2004/0160323 A1 | 8/2004 | Stilp | |
| 2004/0204781 A1 | 10/2004 | Hsien | |
| 2004/0212500 A1 | 10/2004 | Stilp | |
| 2004/0227002 A1 | 11/2004 | Watanabe | |
| 2004/0227057 A1 | 11/2004 | Tuominen et al. | |
| 2004/0227619 A1 | 11/2004 | Watanabe | |
| 2005/0007239 A1 | 1/2005 | Woodard et al. | |
| 2005/0017677 A1 | 1/2005 | Burton et al. | |
| 2005/0029351 A1 | 2/2005 | Yoshinaga et al. | |
| 2005/0043055 A1 | 2/2005 | Vance | |
| 2005/0057422 A1 | 3/2005 | Deguchi et al. | |
| 2005/0075697 A1 | 4/2005 | Olson et al. | |
| 2005/0104457 A1 | 5/2005 | Jordan et al. | |
| 2005/0125093 A1 | 6/2005 | Kikuchi et al. | |
| 2005/0127867 A1 * | 6/2005 | Calhoon et al. | 320/108 |
| 2005/0131495 A1 * | 6/2005 | Parramon et al. | 607/61 |
| 2005/0194926 A1 | 9/2005 | Di Stefano | |
| 2005/0273143 A1 | 12/2005 | Kanzius et al. | |
| 2006/0017438 A1 | 1/2006 | Mullen et al. | |
| 2006/0061325 A1 | 3/2006 | Tang et al. | |
| 2006/0071790 A1 | 4/2006 | Duron et al. | |
| 2006/0094449 A1 | 5/2006 | Goldberg | |
| 2006/0103355 A1 | 5/2006 | Patino et al. | |
| 2006/0113955 A1 | 6/2006 | Nunally | |
| 2006/0121639 A1 | 6/2006 | Tai et al. | |
| 2006/0125703 A1 | 6/2006 | Ma et al. | |
| 2006/0145659 A1 | 7/2006 | Patino et al. | |
| 2006/0145660 A1 | 7/2006 | Black et al. | |
| 2006/0159536 A1 | 7/2006 | Pu | |
| 2006/0160517 A1 | 7/2006 | Yoon | |
| 2006/0164312 A1 | 7/2006 | Mathieu | |

| | | | |
|---|---|---|---|
| 2006/0208903 A1 | 9/2006 | Loh et al. | |
| 2006/0239043 A1 | 10/2006 | Ohbo | |
| 2006/0273756 A1 | 12/2006 | Bowling et al. | |
| 2007/0010295 A1 | 1/2007 | Greene et al. | |
| 2007/0029965 A1 | 2/2007 | Hui et al. | |
| 2007/0046433 A1 | 3/2007 | Mukherjee | |
| 2007/0054705 A1 | 3/2007 | Liow et al. | |
| 2007/0060221 A1 | 3/2007 | Burgan et al. | |
| 2007/0082611 A1 | 4/2007 | Terranova et al. | |
| 2007/0091006 A1 | 4/2007 | Thober et al. | |
| 2007/0096910 A1 | 5/2007 | Waters | |
| 2007/0103110 A1 | 5/2007 | Sagoo et al. | |
| 2007/0103291 A1 | 5/2007 | Adams | |
| 2007/0105524 A1 | 5/2007 | Fullam et al. | |
| 2007/0114945 A1 | 5/2007 | Mattaboni et al. | |
| 2007/0120678 A1 | 5/2007 | Posamentier | |
| 2007/0126395 A1 | 6/2007 | Suchar | |
| 2007/0126650 A1 | 6/2007 | Guenther | |
| 2007/0135078 A1 | 6/2007 | Ljung | |
| 2007/0139000 A1 | 6/2007 | Kozuma et al. | |
| 2007/0145830 A1 | 6/2007 | Lee et al. | |
| 2007/0146218 A1 | 6/2007 | Turner et al. | |
| 2007/0156204 A1 | 7/2007 | Denker et al. | |
| 2007/0164414 A1 | 7/2007 | Dokai et al. | |
| 2007/0171681 A1 | 7/2007 | Baarman | |
| 2007/0188326 A1 | 8/2007 | Pluss et al. | |
| 2007/0205881 A1 | 9/2007 | Breed | |
| 2007/0214940 A1 | 9/2007 | Stoneback | |
| 2007/0222542 A1 | 9/2007 | Joannopolous et al. | |
| 2007/0281625 A1 | 12/2007 | Boys | |
| 2007/0296393 A1 | 12/2007 | Malpas et al. | |
| 2007/0296548 A1 | 12/2007 | Hall et al. | |
| 2007/0298846 A1 | 12/2007 | Greene et al. | |
| 2008/0003963 A1 | 1/2008 | Turner | |
| 2008/0014897 A1 | 1/2008 | Cook et al. | |
| 2008/0054638 A1 | 3/2008 | Greene et al. | |
| 2008/0067874 A1 | 3/2008 | Tseng | |
| 2008/0093934 A1 | 4/2008 | Kato | |
| 2008/0108862 A1 | 5/2008 | Jordan et al. | |
| 2008/0122294 A1 | 5/2008 | Simon et al. | |
| 2008/0122297 A1 | 5/2008 | Arai | |
| 2008/0129147 A1 | 6/2008 | Thiesen et al. | |
| 2008/0167755 A1 | 7/2008 | Curt | |
| 2008/0186129 A1 | 8/2008 | Fitzgibbon | |
| 2008/0191897 A1* | 8/2008 | McCollough | 340/825.22 |
| 2008/0211320 A1 | 9/2008 | Cook et al. | |
| 2008/0211455 A1 | 9/2008 | Park et al. | |
| 2008/0225564 A1 | 9/2008 | Bohm et al. | |
| 2008/0293446 A1 | 11/2008 | Rofougaran et al. | |
| 2008/0296978 A1 | 12/2008 | Finkenzeller et al. | |
| 2008/0309452 A1 | 12/2008 | Zeine | |
| 2009/0002175 A1 | 1/2009 | Waters | |
| 2009/0009177 A1 | 1/2009 | Kim et al. | |
| 2009/0026907 A1 | 1/2009 | Davidowitz et al. | |
| 2009/0045772 A1 | 2/2009 | Cook et al. | |
| 2009/0051224 A1 | 2/2009 | Cook et al. | |
| 2009/0052721 A1 | 2/2009 | Dabrowski | |
| 2009/0058361 A1 | 3/2009 | John | |
| 2009/0072627 A1 | 3/2009 | Cook et al. | |
| 2009/0079268 A1 | 3/2009 | Cook et al. | |
| 2009/0102296 A1 | 4/2009 | Greene et al. | |
| 2009/0102419 A1 | 4/2009 | Gwon et al. | |
| 2009/0109102 A1 | 4/2009 | Dokai et al. | |
| 2009/0111531 A1 | 4/2009 | Cui et al. | |
| 2009/0121713 A1 | 5/2009 | Van Helvoort | |
| 2009/0146892 A1 | 6/2009 | Shimizu et al. | |
| 2009/0167449 A1 | 7/2009 | Cook et al. | |
| 2009/0204170 A1 | 8/2009 | Hastings et al. | |
| 2009/0218884 A1 | 9/2009 | Soar | |
| 2009/0243394 A1 | 10/2009 | Levine | |
| 2009/0273242 A1 | 11/2009 | Cook | |
| 2009/0299918 A1 | 12/2009 | Cook et al. | |
| 2009/0308933 A1 | 12/2009 | Osada | |
| 2010/0013434 A1 | 1/2010 | Taylor-Haw et al. | |
| 2010/0068998 A1 | 3/2010 | Zyambo et al. | |
| 2010/0109445 A1 | 5/2010 | Kurs et al. | |
| 2010/0134366 A1 | 6/2010 | Yu | |
| 2010/0176936 A1 | 7/2010 | Garber et al. | |
| 2010/0277387 A1 | 11/2010 | Schantz et al. | |
| 2010/0289331 A1 | 11/2010 | Shionoiri et al. | |
| 2010/0289449 A1 | 11/2010 | Elo | |
| 2010/0315045 A1 | 12/2010 | Zeine | |
| 2011/0031821 A1 | 2/2011 | Greene et al. | |
| 2011/0050166 A1 | 3/2011 | Cook et al. | |
| 2011/0069516 A1 | 3/2011 | Greene et al. | |
| 2011/0074349 A1 | 3/2011 | Ghovanloo | |

FOREIGN PATENT DOCUMENTS

| | | |
|---|---|---|
| CN | 2582188 Y | 10/2003 |
| DE | 4023412 | 2/1992 |
| DE | 19509918 | 9/1996 |
| DE | 19729722 | 1/1999 |
| DE | 19938460 | 2/2001 |
| DE | 102004009896 | 9/2005 |
| DE | 102005053111 | 5/2007 |
| EP | 0298707 | 1/1989 |
| EP | 0568920 | 11/1993 |
| EP | 0724308 | 7/1996 |
| EP | 0773509 | 5/1997 |
| EP | 1211776 | 6/2002 |
| EP | 1233547 A1 | 8/2002 |
| EP | 1302822 | 4/2003 |
| EP | 1315051 | 5/2003 |
| EP | 1413975 | 4/2004 |
| EP | 1003266 | 4/2006 |
| EP | 1892799 | 2/2008 |
| GB | 1280516 | 7/1972 |
| GB | 1343071 | 1/1974 |
| GB | 2070298 | 9/1981 |
| GB | 2318696 | 4/1998 |
| JP | 57032144 | 2/1982 |
| JP | 62071430 A | 4/1987 |
| JP | 1298901 A | 12/1989 |
| JP | 4115606 A | 4/1992 |
| JP | 04271201 | 9/1992 |
| JP | 5038232 A | 2/1993 |
| JP | 05183318 | 7/1993 |
| JP | 6044207 A | 2/1994 |
| JP | 06133476 | 5/1994 |
| JP | 6044207 U | 6/1994 |
| JP | 6303726 | 10/1994 |
| JP | 6327172 A | 11/1994 |
| JP | 6339232 | 12/1994 |
| JP | 8033244 A | 2/1996 |
| JP | 8-079976 | 3/1996 |
| JP | 8079976 | 3/1996 |
| JP | 8088942 | 4/1996 |
| JP | 8130840 A | 5/1996 |
| JP | 8162689 A | 6/1996 |
| JP | 09037475 | 2/1997 |
| JP | 10225020 | 2/1997 |
| JP | 9182322 | 7/1997 |
| JP | 10097931 | 4/1998 |
| JP | 2000078763 | 9/1998 |
| JP | 2000175379 | 12/1998 |
| JP | 11143600 | 5/1999 |
| JP | 11188113 A | 7/1999 |
| JP | 11191146 | 7/1999 |
| JP | 11215802 A | 8/1999 |
| JP | 11332135 | 11/1999 |
| JP | 2000217279 | 8/2000 |
| JP | 2001024548 A | 1/2001 |
| JP | 2001197672 | 7/2001 |
| JP | 2001238372 A | 8/2001 |
| JP | 2001264432 A | 9/2001 |
| JP | 2001526374 A | 12/2001 |
| JP | 2002017058 A | 1/2002 |
| JP | 2002078247 A | 3/2002 |
| JP | 2002508916 A | 3/2002 |
| JP | 2002152191 A | 5/2002 |
| JP | 2002320347 | 10/2002 |
| JP | 2003047177 A | 2/2003 |
| JP | 2003069335 A | 3/2003 |
| JP | 2003189507 A | 7/2003 |
| JP | 2004187429 A | 7/2004 |
| JP | 2005039756 A | 2/2005 |
| JP | 2005045298 A | 2/2005 |
| JP | 2005137040 | 5/2005 |

| | | | |
|---|---|---|---|
| JP | 2005261187 A | 9/2005 | |
| JP | 2006042519 | 2/2006 | |
| JP | 2006510101 A | 3/2006 | |
| JP | 2006115592 A | 4/2006 | |
| JP | 2006149163 A | 6/2006 | |
| JP | 2008508842 A | 3/2008 | |
| JP | 2009501510 A | 1/2009 | |
| JP | 2010539821 A | 12/2010 | |
| KR | 102000017058 | 3/2000 | |
| KR | 1020010000674 | 1/2001 | |
| KR | 1020010030472 | 4/2001 | |
| KR | 20020064451 A | 8/2002 | |
| KR | 20050016879 A | 2/2005 | |
| KR | 1020050019926 | 3/2005 | |
| KR | 20060070795 A | 6/2006 | |
| KR | 20070017804 A | 2/2007 | |
| KR | 20100083846 A | 7/2010 | |
| WO | WO8807732 | 10/1988 | |
| WO | 9323908 A1 | 11/1993 | |
| WO | WO/96/19028 | 6/1996 | |
| WO | 9850993 A1 | 11/1998 | |
| WO | WO9857413 A1 | 12/1998 | |
| WO | WO9930090 A1 | 6/1999 | |
| WO | WO/99/50780 | 10/1999 | |
| WO | WO/99/50806 | 10/1999 | |
| WO | WO0054387 | 9/2000 | |
| WO | WO/01/67413 | 9/2001 | |
| WO | WO02060215 | 8/2002 | |
| WO | WO03077364 A2 | 9/2003 | |
| WO | WO03105308 | 12/2003 | |
| WO | WO/2004/038887 | 5/2004 | |
| WO | WO2004052563 | 6/2004 | |
| WO | WO2004073166 | 8/2004 | |
| WO | WO/2004/077550 | 9/2004 | |
| WO | WO/2005/086279 | 9/2005 | |
| WO | WO2006006636 A1 | 1/2006 | |
| WO | WO2006011769 A1 | 2/2006 | |
| WO | WO2006031785 A1 | 3/2006 | |
| WO | WO2007008646 A2 | 1/2007 | |
| WO | WO2007048052 | 4/2007 | |
| WO | 2007083574 A1 | 7/2007 | |
| WO | WO/2007/077442 | 7/2007 | |
| WO | WO2008012702 | 1/2008 | |

OTHER PUBLICATIONS

International Search Report and Written Opinion—PCT/US07/001527—International Search Authority, European Patent Office—Oct. 18, 2007.
Efficient wireless non-radiative mid-range energy transfer, MITpaper, publication and date unknown, believed to be 2007.
Wireless Non-Radiative Energy Transfer, MIT paper, publication and date unknown, believed to be 2007.
Wireless Power Transfer via Strongly Coupled Magnetic Resonances, Kurs et al, Science Express, Jun. 7, 2007.
Wireless Power Transfer via Strongly Coupled Magnetic Resonances, Kurs et al, scimag.org, Jul. 6, 2007.
Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date: Sep. 3-5, 2008 On p. 1 Print ISBN: 978-1-4244-1848-0 INSPEC Accession Number: 10394615 Digital Object Identifier: 10.1109/VPPC.2008.4677798 Date of Current Version: Nov. 18, 2008.
Karalis et al., "Efficient wireless no-rediative mid-range energy transfer", Science Direct, Annals of Physics, 323(1),34-48.(Jan. 2008). doi:10.1016/j.aop.2007.04.017.
Kim et al., "Electrically Small Magnetic Dipole Antennas With Quality Factors Approaching the Chu Lower Bound", Antennas and Propagation, IEEE Transactions on vol. 58 Issue: 6 Publication Date: Jun. 2010 pp. 1898-1906 Digital Object Identifier: 10.1109/TAP.2010.2046864.
Miranda et al., "Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010, pp. 4179-4186 IEEE Conferences.
Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.
Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.
Dong-Gi Youn et al, "A Study on the Fundamental Transmission Experiment for Wireless Power Transmission System," 1999 IEEE Conference, TENCON 99, vol. 2, pp. 1419-1422, Sep. 1999.
Dudek et al., "High permeability micro-magneto-mechanical systems," International Journal of Applied Electromagnetics and Mechanics (2007), vol. 25, pp. 103-108.
Finkenzeller, "RFID Handbook: Fundamentals and Applications in Contactless Smart Cards and Identification," Second Edition, Translated by Rachel Waddington, 2003, John Wiley & Sons Ltd., pp. 106-111.
McSpadden et al, "A High Conversion Efficiency 5.8 GHz Rectenna," 1997 IEEE Microwave Symposium, vol. 2, pp. 547-550, Jun. 1997.
McSpadden et al, "Theoretical and Experimental Investigation of a Rectenna Element for Microwave Power Transmission," 1992 IEEE Transactions on Microwave Theory and Techniques, vol. 40, pp. 2359-2366, Dec. 1992.
Kim et al., Switchable polymer-based thin film coils as a power module wireless neural interfaces, Sensors and Actuators, vol. A 136, Issue 1, May 2007 (available online Nov. 27, 2006), pp. 467-474.
Myers et al., "A transcutaneous power transformer," Trans. Amer. Soc. Artif. Inter. Organs, vol. 14, 1968, pp. 210-219.
Shinohara et al, "Experimental Study of Large Rectenna Array for Microwave Energy Transmission," 1998 IEEE Transactions on Microwave Theory and Techniques, vol. 46, pp. 261-268, Mar. 1998.
Onizuka et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.
Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.
Sekitani et al, "A Large-area Wireless Power-Transmission Sheet Using Printed Organic Transistors and Plastic MEMS Switches," Nature Materials Letter, pp. 413-417; Jan. 2007.
Kurs et al., "Wireless Power Transfer via Strongly Coupled Magnetic Resonances", scimag.org, Jul. 6, 2007.
Schuder et al., "High Level electromagnetic energy transfer through a closed wall", Inst.Radio Engrs. Int.Conf Record 9, pp. 119-126, 1961.
Schuder, "Powering an artificial heart: Birth of the inductively coupled-radio frequency system in 1960", Artificial organs, vol. 26, No. 11, 2002, pp. 909-915.
Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

* cited by examiner

METHOD AND SYSTEM FOR POWERING AN ELECTRONIC DEVICE VIA A WIRELESS LINK

CROSS-REFERENCE TO RELATED APPLICATIONS

Claim of Priority Under 35 U.S.C. §119

This application claims priority under 35 U.S.C. Section 119(e) to U.S. Provisional Patent Application 60/760,064 entitled "Method and System for Charging an Electronic Device via a Wireless Link" filed on Jan. 18, 2006, which is incorporated by reference in its entirety.

BACKGROUND

1. Field

The present invention relates generally to methods and systems for powering or charging an electronic device.

2. Background

Recent developments in technology enable certain electronic devices, such as notebook computers, cell phones, and PDAs (personal digital assistant), to run various multimedia applications. However, these new multimedia applications require a large amount of power to run. A good solution to this challenge may be a system which may charge these electronic devices without having to plug them into the electric outlet. There is also a significant benefit in convenience and safety when any of such devices, for example a cell phone, is kept adequately charged without the need to connect a power wire.

SUMMARY

In one aspect, a system configured to provide power to a chargeable device via radio frequency link is provided. The system comprises a transmitter configured to generate a substantially unmodulated signal for powering or charging the chargeable device. The system further comprises a transmit antenna configured to receive the substantially unmodulated signal from the transmitter and radiate a substantially unmodulated radio frequency (RF) signal to the chargeable device.

In another aspect, a system configured to provide power to a chargeable device via a radio frequency link is provided. The system comprises a first transmitter configured to transmit a first signal via a first antenna for powering or charging the chargeable device. The system further comprises a second transmitter configured to transmit a second signal via a second antenna for powering or charging the chargeable device, wherein the combination of the first and second signals power or charge the chargeable device.

In another aspect, a method of providing power to a chargeable device via radio frequency link is provided. The method comprises generating a substantially unmodulated signal. The method further comprises radiating a substantially unmodulated radio frequency (RF) signal to the chargeable device via a transmit antenna based on the substantially unmodulated signal. The method further comprises powering or charging the chargeable device with power delivered by the substantially unmodulated RF signal.

In another aspect, a method of providing power to a chargeable device via radio frequency link is provided. The method comprises transmitting a first signal via a first antenna to a chargeable device. The method further comprises transmitting a second signal via a second antenna to the chargeable device. The method further comprises powering or charging the chargeable device with power delivered by the combination of the first and second signals.

DETAILED DESCRIPTION

The following detailed description is directed to certain specific embodiments of the invention. However, the invention may be embodied in a multitude of different ways as defined and covered by the claims. In this description, reference is made to the drawings wherein like parts are designated with like numerals throughout.

The word "exemplary" is used herein to mean "serving as an example, instance, or illustration." Any embodiment described herein as "exemplary" is not necessarily to be construed as preferred or advantageous over other embodiments.

Certain embodiments related generally to methods and systems for charging a portable power source, such as a battery, of an electronic device, are disclosed. More particularly, these embodiments relate to supplying power to the electronic device via a wireless link, such as by using radio frequency (RF) waves.

Figure 1:
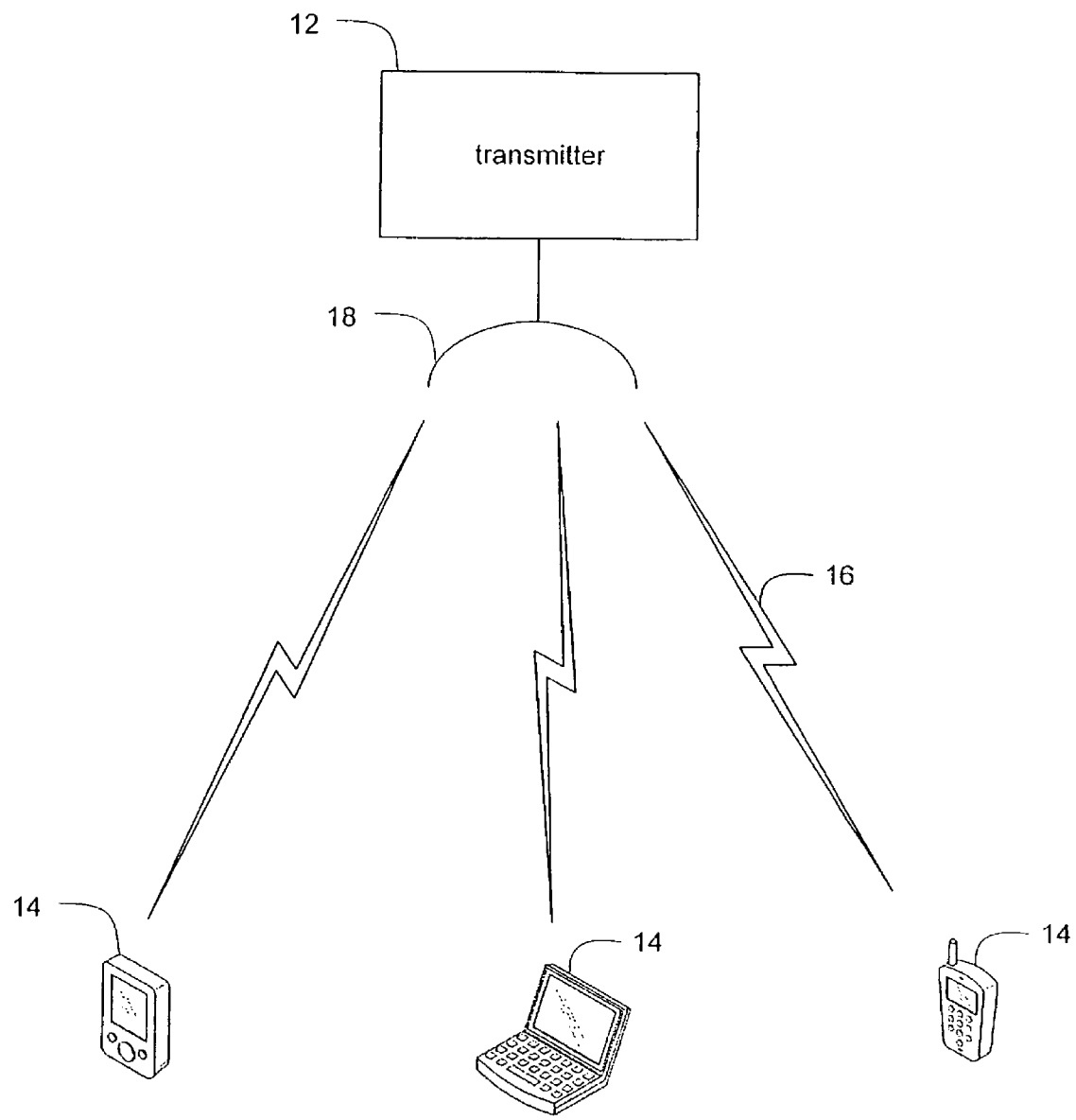
FIG. 1 illustrates an overview of one exemplary embodiment of a system for powering or charging an electronic device via a wireless link.

FIG. 1 illustrates an overview of one exemplary embodiment of a system for powering or charging an electronic device via a wireless link. In the exemplary embodiment, the system includes one or more transmitters 12, each in communication with one or more transmitting antennas 18. One or more electronic devices 14 are shown in FIG. 1 in communication with the one or more transmitters 12.

The transmitter 12 generates signals carrying power or energy and send such signals to the transmitting antenna 18 through a feed line (not shown) connecting the transmitter to the antenna. In certain embodiments, signals carrying power or energy may comprise radio frequency (RF) signals. In one embodiment, the transmitter 12 may comprise a radio frequency signal source and an amplifier. The radio frequency signal source generates a radio frequency signal of limited power at specified frequencies. The amplifier then amplifies the signal generated by the signal source and feeds the amplified signal to the transmitting antenna via an appropriate interface (e.g., RF cable).

In one embodiment, the transmitting antenna 18 may be omni-directional or directional. Omni-directional antennas radiate radio signals substantially all round the antenna, while directional antennas concentrate radio signals in a particular angle, e.g., an angle of less than 180 degrees. The angle of signal coverage provided by an antenna is typically measured by beamwidth. In another embodiment, it is desirable to use a directional antenna as the transmitting antenna 18, such as a directional antenna with a beam-width between 0.1-20 degrees. For example, the beam-width may be selected at about 0.05, 0.1, 0.2, 0.25, 0.3, 0.5, 0.75, 1, 2, 3, 4, 5, 6, 7, 8, 9, 10, 11, 12, 13, 14, 15, 16, 17, 18, 19, or 20 degrees or more. In addition, the transmitting antenna 18 is selected to operate at the frequencies of signals to be radiated within reasonable gain.

In certain embodiments, it is desirable to select an antenna that has high power gain as the transmitting antenna 18 so that sufficient power is transmitted to the chargeable device 14 (see FIG. 1). In one embodiment, the power gain of the transmitting antenna 18 may be about 5, 6, 7, 8, 9, 10, 11, 12, 13, 14, 15, or 16 decibels (dBd) or more. In this document, the term dBd describes a well-known logarithmic ratio of the power intensity at beam center relative to the power intensity of an otherwise comparable half-wave dipole antenna. When using an antenna with 12 decibel power gain, for example, the transmitting antenna 18 may concentrate the signal it receives so that the power intensity is about 16 times the power intensity from a simple half-wave dipole antenna.

As noted above, the transmitting antenna 18 receives radio frequency signals carrying power or energy from the transmitter 12 and radiates such signals to the electronic devices 14 via a wireless link 16. The electronic devices 14 may be any chargeable or non-chargeable devices comprising at least one of a media player, a personal data assistant (PDA), a portable computer (e.g., a notebook personal computer), a mobile or cellular phone, a clock, an electronic display, or any other device that utilizes electric power, optionally from a portable source, such as a rechargeable battery. Description of typical systems and methods of using received energy to power or charge an electronic device 14 may be found in at least US patent publication no. 2005/0194926 and U.S. Pat. Nos. 6,127,799 and 7,012,405, which are incorporated herein by reference.

Figure 2A:
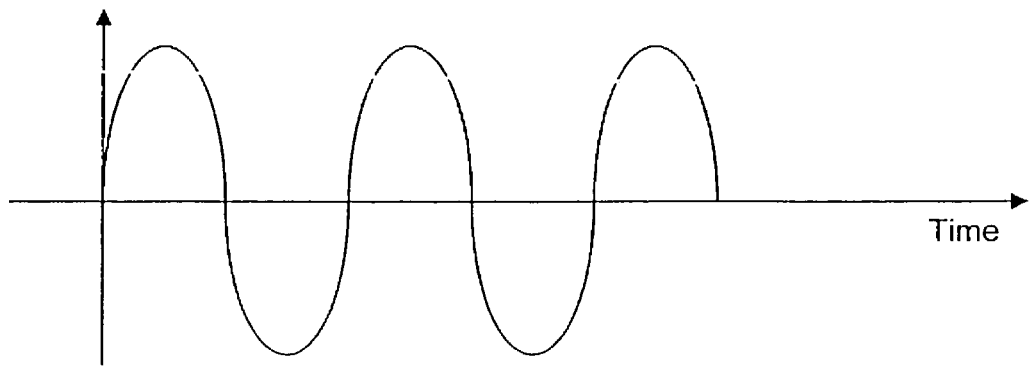
FIGS. 2A, 2B, and 2C illustrate examples of an electric signal that may be used by the transmitter 12 in FIG. 1 to transmit power.
Figure 2B:
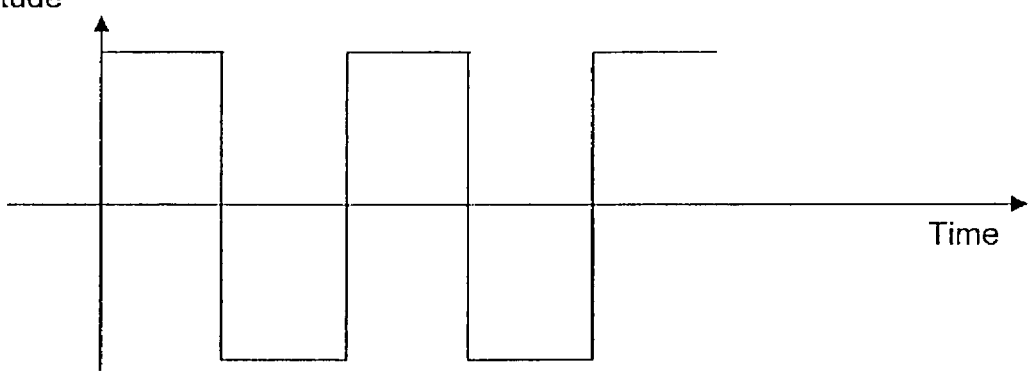
Figure 2C:
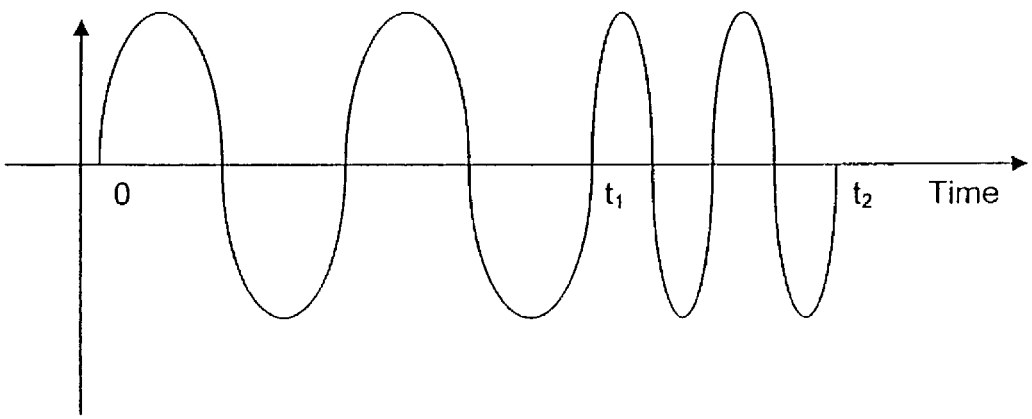

FIGS. 2A, 2B, and 2C illustrate examples of a signal waveform that may be used by the transmitter 12 in FIG. 1 to transmit power. FIG. 2A is a two-dimensional graph of a pure (e.g. substantially unmodulated) sinusoidal wave signal. The vertical axis represents the amplitude of the pure sinusoidal wave signal while the horizontal axis represents the time. For any of the waveforms discussed here, depending upon the context, the amplitude may represent electric voltage (measured in volts), electric field intensity (measured in volts per meter), electric current (measured in amperes), or magnetic field intensity (measured in amperes per meter). As shown, the pure sinusoidal wave signal is a periodic function of the time. FIG. 2B is a two-dimensional graph of a square wave signal. The vertical axis represents the amplitude of the square wave signal while the horizontal axis represents the time. As shown, the square wave signal is a periodic function of the time. FIG. 2C is a two-dimensional graph of a frequency modulated sinusoidal wave signal. The vertical axis represents the amplitude of the frequency modulated sinusoidal wave signal while the horizontal axis represents the time.

The frequency modulated sinusoidal wave is shown as a function of the time. In FIG. 2C, the frequency of the frequency modulated signal during the period $0$-$t_1$ varies from the frequency during the period $t_1$-$t_2$. Signals of other waveforms including, for example, a continuous-wave (CW) single-frequency signal, a modulated sinusoidal wave signal other than the frequency modulated signal shown in FIG. 2C, and other periodic signals may also be used to carry and deliver the electric power to the electronic devices 14 (see FIG. 1).

It should be noted that modulation refers to the process of varying a measurable property (such as amplitude, frequency or phase, or some combination thereof) of a carrier signal (e.g., a sinusoidal signal) in order to communicate information. The resulting varied signal is referred to as modulated signal.

In certain embodiments, the transmitter 12 is configured to generate substantially unmodulated signals to carry the charging energy via the wireless link 16 (see FIG. 1). Examples of substantially unmodulated signals may be, but not limited to, a pure sinusoidal wave signal as shown above in FIG. 2A. In one embodiment, a pure (e.g. substantially unmodulated) sinusoidal wave signal is used to carry and deliver the charging power. A pure sinusoidal wave signal is characterized by a relatively narrow bandwidth centered on a substantially single fundamental frequency. In another embodiment, other periodic wave signals such as square, pulse, triangular, sawtooth or irregular signals made up of a base sinusoidal wave and at least one harmonic sinusoidal wave may be used. Typically, the base sinusoidal wave signal has a lowest frequency, called the fundamental frequency, and which typically has the largest amplitude. The harmonic sinusoidal wave signal has a frequency which is an integer multiple of the fundamental frequency and typically has an amplitude lower than the base sinusoidal wave signal. Because other periodic wave signals contain at least one harmonic sinusoidal wave signal, they have a bandwidth wider than a pure sinusoidal wave signal. A frequency modulated (FM) sinusoidal signal such as the one shown in FIG. 2C also has a wider bandwidth than a pure sinusoidal wave signal, because it contains sinusoidal waves of substantially different frequencies. Using a pure sinusoidal wave signal to carry energy provides many advantages over other types of signals and therefore, may be chosen over other alternatives in certain embodiments.

In one embodiment, the transmitter 12 may advantageously achieve high power transfer efficiency using a pure sinusoidal signal. First, a pure sinusoidal wave signal has a narrow frequency bandwidth, which enables antennas and other devices to be matched precisely in frequency and achieve high power transfer efficiency. Second, the single-frequency purity of the transmitted beam enables a collimated transmission, limits beam divergence, and leads to a high power transfer efficiency.

Another example is that using a pure sinusoidal wave signal simplifies the system design and reduces the manufacturing cost, because no modulation is required. Further, using a pure sinusoidal wave signal keeps the interference effects to a minimum because a pure sinusoidal wave signal has a narrow frequency bandwidth.

The signals used for delivering energy may be selected at any desired frequency and power level suitable for carrying and delivering power sufficient to charge the chargeable device 14. Generally, an exemplary radio frequency signal has a frequency between 3 MHz to 30 GHz. For example, the signal used for delivering energy may be of a frequency of about 30, 40, 50, 60, 70, 80, 90, 100, 200, 300, 400, 500, 600, 800, 900 MHZ, or 1 GHz.

Many factors, technical and non-technical, such as the human RF exposure allowed by the FCC may impact the search to find a frequency for signals carrying and delivering power. For example, it is also desirable for the receiving antenna's equivalent aperture be large. The effective aperture of an antenna increases significantly at lower frequencies because it is proportional to the square of the wavelength. As a result, the delivered power increases. The equivalent aperture of an antenna, measured in square meters, is the ratio of the power (in watts) received by that antenna from an incoming radio wave, to the power intensity of that wave (in watts per square meter). Use of a lower frequency gives us a larger effective aperture, but on the other hand, at lower frequencies, the size of a receiving antenna, such as a dipole antenna, may become cumbersome for applications such as mobile handset. In one embodiment, the signal may be selected with a frequency between 1 GHz to 40 GHz, and preferably between 12 GHz to 36 GHz. In another embodiment, the signal may be selected with a frequency between 30 MHz to 300 MHz, and preferably between 88 MHz to 108 MHz. The frequency band ranging from 88 MHz to 108 MHz, used worldwide for FM broadcasting. This band is divided into 100 channels with 200 kHz spacing. It is possible to apply for dual use as a single-frequency transmission in the spacing between channels because the transmission involved in the invention would not interfere with existing FM channels. For example, the transmission discussed here may be made at a frequency of 100.2 MHz, which is 100 kHz away from each of the neighboring channels of 100.1 MHz and 100.3 MHz.

Figure 3:
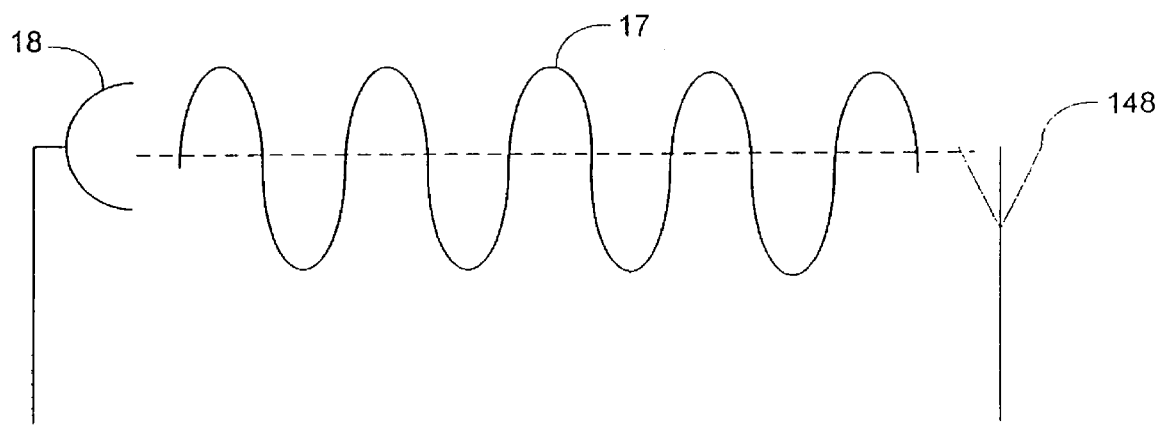
FIG. 3 illustrates an overview of one exemplary embodiment of a system communicating a radio frequency signal for carrying and delivering energy from an antenna to a device.

FIG. 3 illustrates an overview of one exemplary embodiment of a system communicating a radio frequency signal for carrying and delivering energy from an antenna to a device. In the exemplary embodiment, a transmitting antenna 18 sends a pure sinusoidal wave radio frequency signal 17 to a receiving antenna 148 of the chargeable device 14. The transmitting antenna 18 may be directional or omni-directional.

The radio frequency signal 17 may be either modulated or substantially unmodulated. In certain embodiments, the radio frequency signal 17 is substantially unmodulated. Due to imperfections in the system, the signal may have small deviations in its amplitude, frequency or phase which do not detract seriously from its applicability to the present invention. In other embodiments it is desirable to intentionally modulate the amplitude, frequency or phase of the signal briefly from time to time, for purposes of legal identification of the transmitter(s) or for identifying which transmitter produces a particular radio signal for installation, adjustment or troubleshooting purposes. Legal identification of the radio transmitter may be required, in certain embodiments, by the FCC or other government agencies. For example, legal identification may be implemented by means of a brief series of interruptions in the radio signal transmission to provide a Morse code representation of the call letters of that transmitter. In the exemplary embodiment, a pure sinusoidal wave radio frequency signal 17 is used.

The receiving antenna 148 is included in the transmitter 14 shown in FIG. 1 respectively. Alternatively, the receiving antenna 148 may be attached to the chargeable device 14 externally. In case the chargeable device 14 has an antenna for data communication, the receiving antenna may or may not be the same antenna used for data communication. In certain embodiments, the receiving antenna 148 is configured to be omni-directional thus allowing the user to place the chargeable device in one of multiple orientations. The chargeable device 14 will be described in further detail in connection with FIG. 4.

A radio frequency signal (also known as an electromagnetic wave) is a combined transverse radiated wave resulting from an electric field wave and a magnetic field wave. The electric or voltage wave (electric field E measured in volts/meter) is generated when a voltage difference exists between two parts of an antenna, for example the two conductive rod parts of a dipole antenna. The magnetic or current wave (magnetic field H measured in amperes/meter) is generated when a current travels through any parts of the antenna, for example current flow along the length axis of the two rods in a dipole antenna. The product of the electric field E and magnetic field H gives the power intensity of the radio frequency wave (measured in watts/meter$^2$). Generally, polarization of an electromagnetic wave refers to the spatial orientation of the electric field component of the electromagnetic wave. The polarization of an antenna is the polarization of an electromagnetic wave radiated by the antenna. When the polarization direction of a receiving antenna is parallel to the electric field orientation of an incoming electromagnetic wave, the maximum power is delivered from the wave to the antenna, compared to other orientations of the antenna. The concept of polarization of radio frequency waves is disclosed in at least U.S. Pat. No. 5,936,575, which is incorporated herein by reference.

In certain embodiments, the polarizations of the transmitting antenna 18 and of the receiving antenna 148 are aligned for maximum power transfer. Since it is desirable to allow the user to place the chargeable device 14 placed in a desired orientation, the transmitting antenna 18's polarization may be adjusted to match alignment by rotating the electric field of the radio frequency signal 17.

In one embodiment, both the transmitting antenna 18 and the receiving antenna 148 are directional antennas such that a fixed point-to-point wireless link is established for transmission.

Figure 4:
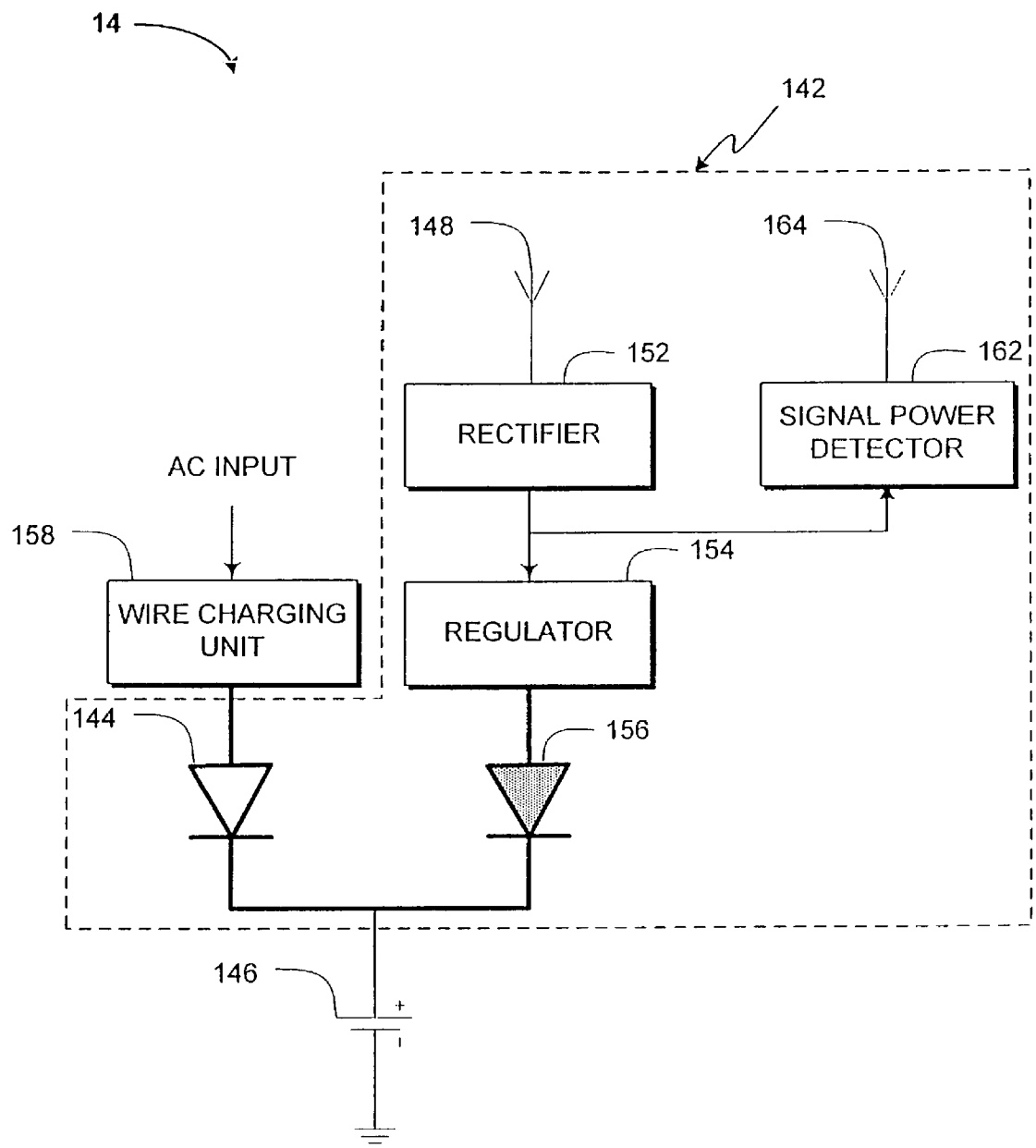
FIG. 4 is a block diagram illustrating one embodiment of a chargeable device 14 shown in FIG. 1.

FIG. 4 is a block diagram illustrating one embodiment of a chargeable device 14 shown in FIG. 1. The device 14 may comprise a receiver unit 142 and a rechargeable battery 146. The rechargeable battery 146 may be any rechargeable power storage unit configured to supply power to the chargeable device 14. The receiver unit 142 is configured to receive signals carrying charging power and charge the rechargeable battery 146 with the received power. Though the receiver unit 142 may be integrated in the chargeable device 14 in the exemplary embodiment, the receiver unit 142 may be a stand-alone unit which may be attached via wire or cable to a variety of types of chargeable devices 14 and deliver the charging energy to the chargeable device 14 through the link established by wire or cable.

The chargeable device 14 comprises a receiving antenna 148 which gathers some of the beamed radio frequency power radiated by the transmitting antenna 18 (see FIG. 1) and delivers these AC signals to a rectifier 152. The rectifier 152 then coverts the AC electrical energy from the receiving antenna 148 to a unidirectional pulsating signal and/or ultimately into a DC signal suitable for charging the rechargeable battery 146. An exemplary rectifier 152 may comprise a Germanium-based rectifier characterized by a low barrier or threshold voltage (i.e., low on-power rectifier), to allow activation of the rectifier 152 in the event of receiving a low level signal. The rectifier may also be fabricated using Silicon, Gallium Arsenide, and other semiconductor materials as well. The rectifier 152 may also be characterized as a passive RF power sensor to minimize the use of power by the rectifier 152 from the chargeable device 14.

In one embodiment, the receiver unit 142 comprises a voltage regulator 154. The voltage regulator 154 may be integrated with or in addition to the rectifier 152 to regulate or limit the voltage supplied to the rechargeable battery 146 at a pre-determined level. The voltage regulator 154 may operate particularly when the physical movement of the chargeable device 14 causes the voltage of signals received by the receiving antenna 148 to vary significantly. This variation may be due to the variation in the geometric signal path from the transmitting antenna 18 to the receiving antenna 148.

In one embodiment, the receiver unit 142 also comprises a pair of diodes 144 and 156, which allow the rechargeable battery 146 to be charged by either a wire charging unit 158 or signals received by the receiving antenna 148. The rechargeable battery 146 is charged by the wire charging unit 158 whenever the wire charging unit is connected via wire to an AC power source such as a standard AC power outlet. The rechargeable battery may be charged by signals received by the receiving antenna 148 when the wire charging unit does not provide charging power. Examples of the wire charging unit 158 may be found in most rechargeable electronic devices such as a cell phone.

In one embodiment, the receiver unit 14 may further comprise a signal power detector 162 for detecting the power intensity of the signal received at the receiving antenna 148. The signal power detector may be connected directly to the receiving antenna 148, to the rectifier 152, or the regulator 154. In one embodiment, the signal power detector 162 is connected to detect the signal output from the rectifier 152.

As will be described in connection with FIG. 7, a transmitting antenna 164 then transmits a signal indicative of the power intensity of the charging signal received to the transmitter 12 (see FIG. 1). The transmitting antenna 164 may be directional or omni-directional. The transmitting antenna 164 may be integrated with or separate from the receiving antenna 148. In case the chargeable device 14 has an antenna for radio communication, the transmitting antenna 164 may or may not be the same antenna used for data communication. Numerous other alternative means are suitable to convey signals reporting the delivered radio signal strength. For example, such information may be reported by means of visible or non-visible light (infra red or ultra violet light), by means of sound or acoustic signals either audible to humans or not, or by means of connecting wires.

Figure 5:
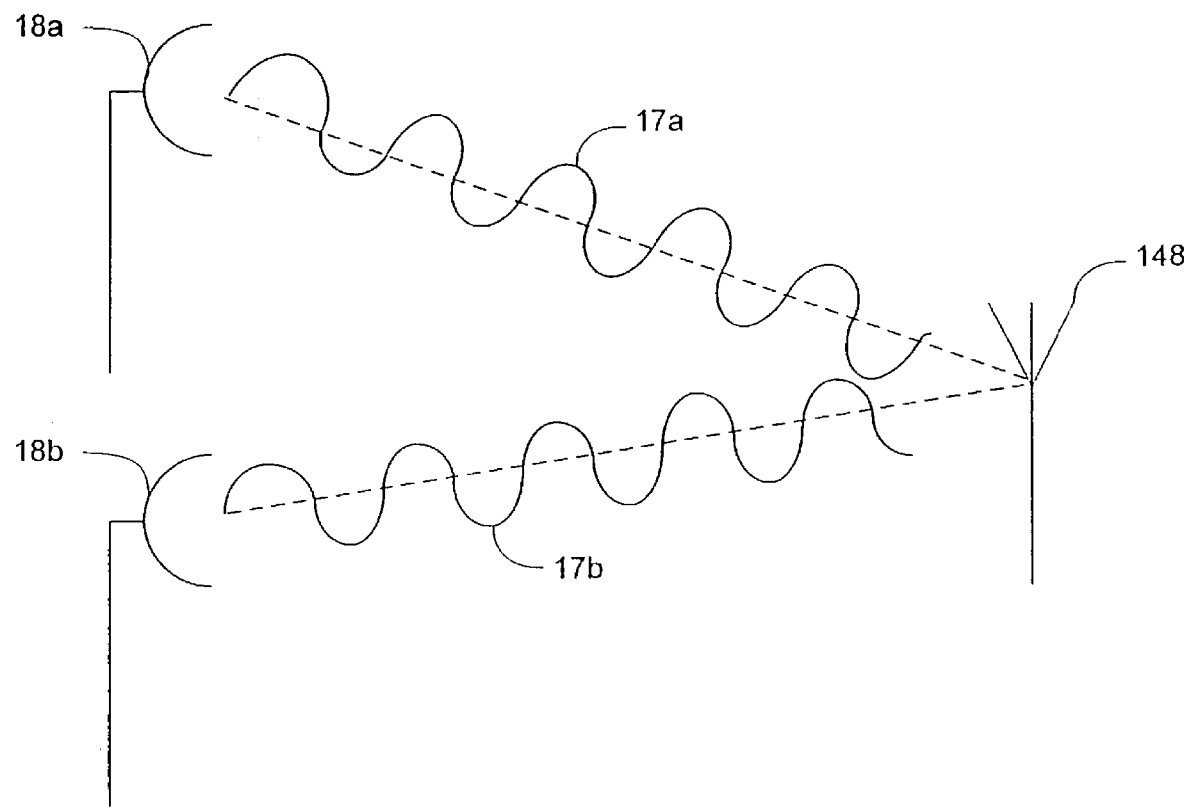
FIG. 5 illustrates an overview of another exemplary embodiment of a system for powering a device or charging an electronic device via a wireless link.

FIG. 5 illustrates a schematic overview of another exemplary embodiment of a system for powering or charging an electronic device via a wireless link. In this embodiment, the system comprises at least two transmitters (not shown in this figure) coupled to at least two transmitting antennas 18a and 18b respectively, each communicating an substantially unmodulated radio frequency signal for carrying and delivering energy to charge an electronic device. A first transmitting antenna 18a sends a first radio frequency signal 17A to a receiving antenna 148 of a chargeable device 14. A second transmitting antenna 18b sends a second radio frequency signal 17B to the receiving antenna 148. These radio frequency signals 17A and 17B may be selected to be similar to the signals used for transmitting charging power discussed above in relation to FIGS. 2A, 2B, and 2C. These radio frequency signals 17A and 17B may be either modulated or substantially unmodulated. In this exemplary embodiment, pure sinusoidal wave radio frequency signals 17A and 17B are used. In other embodiments, more than two transmitters may be used, e.g., 3, 4, 5, 6, 7, 8, 9, 10, or more transmitters may be used concurrently.

In certain embodiments, it is desirable that the first and the second signals 17A and 17B reach the receiving antenna 148 substantially in phase to maximize the power received by the chargeable device 14 and achieve efficient power transfer. Two signals are said to be in phase when they have a phase difference of about 0 degrees. In one embodiment, the first and second signals 17A and 17B are substantially the same, except that there is a phase offset between them when transmitted by the transmitting antennas 18a and 18b. The phase offset may be calculated such that the first and second signals 17A and 17B, each traveling though a different wireless link after transmission by its respective transmitting antenna, arrive at the receiving antenna 148 with a phase difference of about 0 degrees. In another embodiment, the first and second substantially unmodulated signals 17A and 17B are pure sinusoidal radio frequency signal of the same single frequency.

Figure 6A:
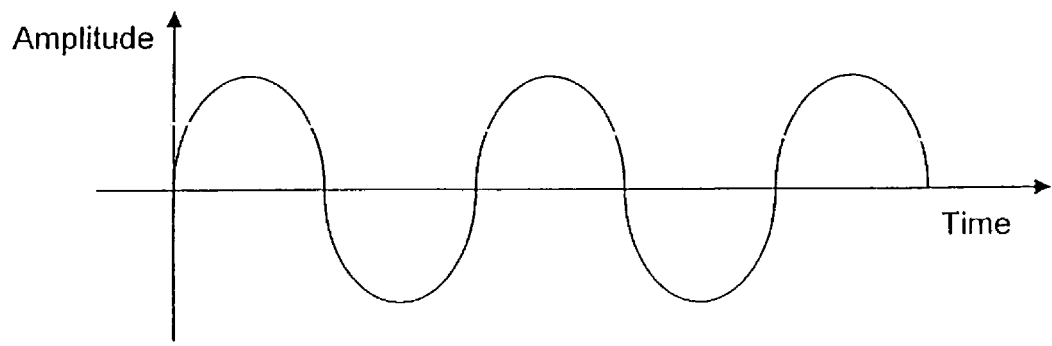
FIGS. 6A, 6B, and 6C illustrate how two in-phase signals interfere constructively.
Figure 6B:
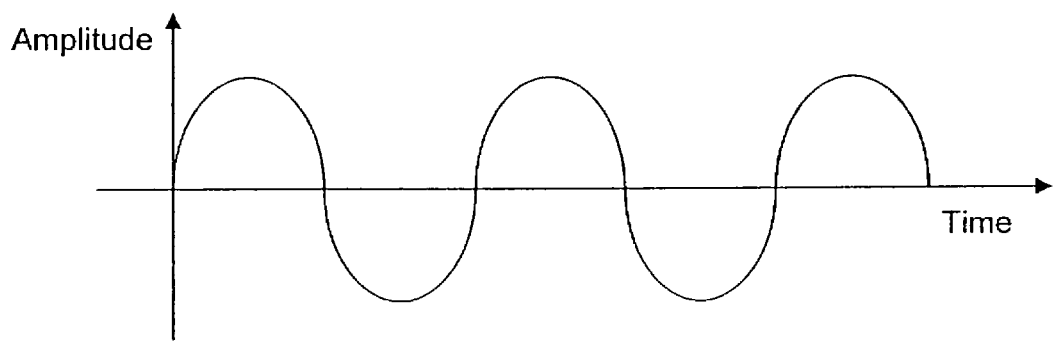
Figure 6C:
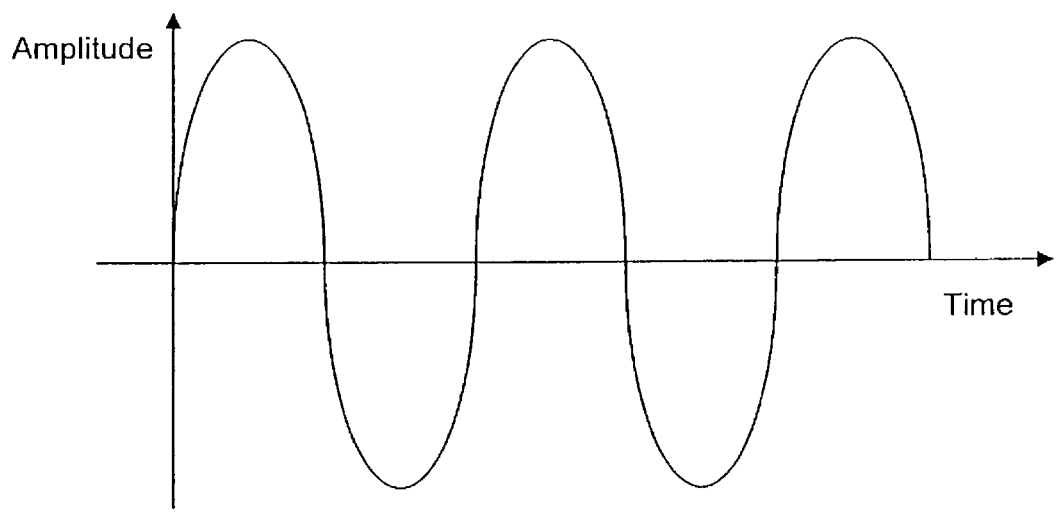

FIGS. 6A, 6B, and 6C illustrate how two in-phase signals interfere constructively. FIGS. 6A and 6B show two identical sinusoidal radio frequency signals where the amplitude of the signal is a periodic function of time. The amplitude of each signal is indicative of the strength of the electric field generated by the signal. These two signals, when arriving at the same point, interfere with each other. FIG. 6C shows the resulting signal of such interference. As shown in FIG. 6C, the resulting signal has amplitude twice the amplitude of the each original signal as shown in FIGS. 6A and 6B. Since the power intensity of the radio frequency signal is proportional to the square of the electric field strength, the power intensity of the signal in FIG. 6C is four times the power of either of the two signals shown in FIGS. 6A and 6B considered individually. Although sinusoidal signals are used in the example, similar result may follow as to other types of modulated or substantially unmodulated signals. Also, although the exemplary signals shown in FIG. 6A and in FIG. 6B are the same, they do not have to be of the same amplitude in order to interfere constructively with each other.

Figure 7:
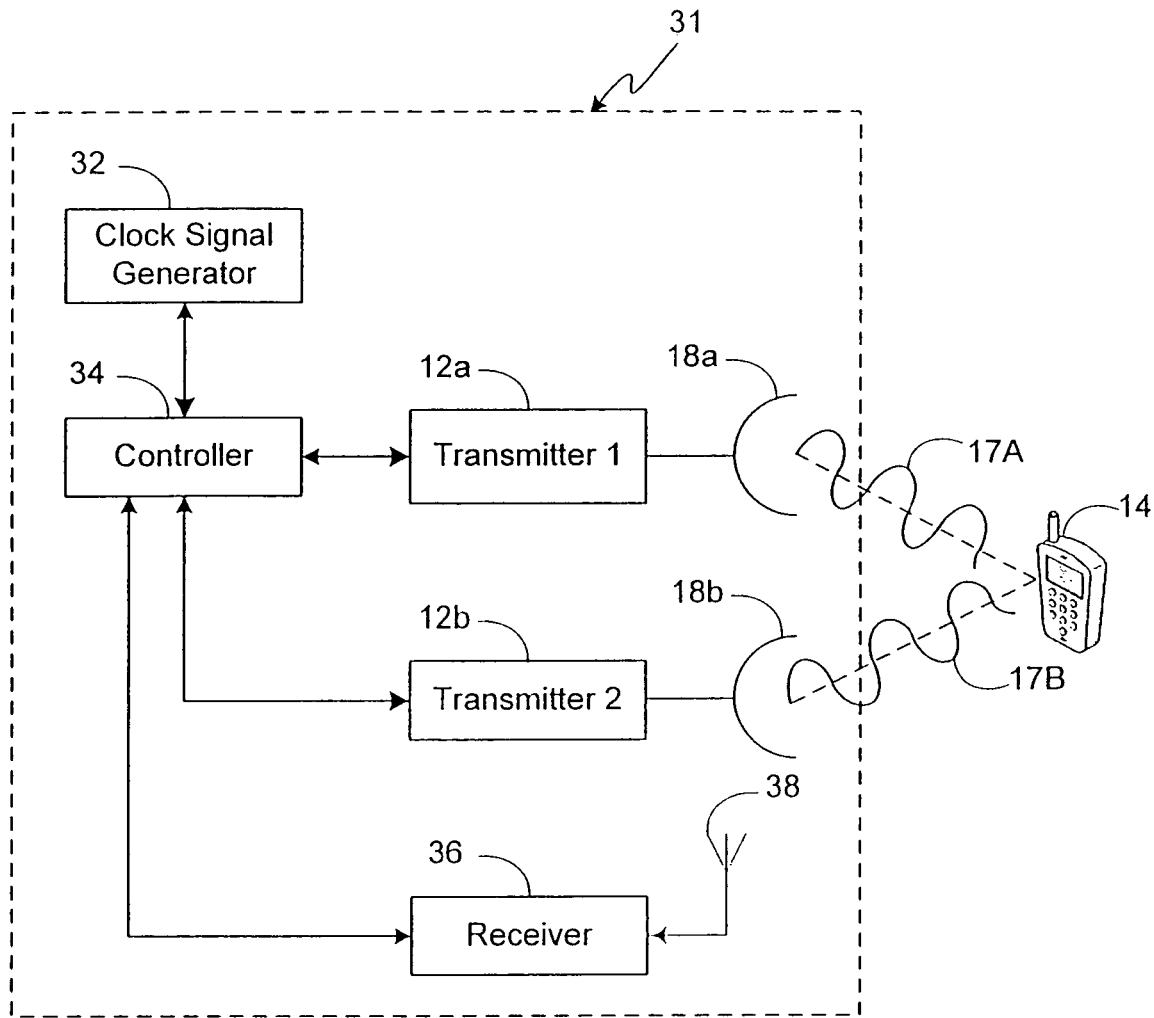
FIG. 7 is a block diagram illustrating an embodiment of a system transmitting two radio frequency signals to power or charge a chargeable device concurrently.

FIG. 7 is a block diagram illustrating an embodiment of a system transmitting two radio frequency signals to power or charge a chargeable device concurrently. The system 31 comprises a clock signal generator 32 which generates a common clock signal and sends the clock signal to a controller 34. In one embodiment, the clock signal generator 32 may be an oscillator. There may be various embodiments of the controller 34. In one embodiment, the controller 34 is a processor which may be any suitable general purpose single- or multi-chip microprocessor, or any suitable special purpose microprocessor such as a digital signal processor, microcontroller, or a programmable gate array. As is conventional, the processor may be configured to execute one or more programmed instructions.

The controller 34 coordinates generating two radio frequency signals 17A and 17B by transmitters 12a and 12b based on the common clock signal such that both signals are on a common time frame. Each transmitter is connected to a separate transmitting antenna which transmits the received radio frequency signal to the chargeable device 14. The radio frequency signals 17A and 17B arriving at the chargeable device 14 then interfere with each other and generate a combination signal. The energy carried in the combination signal is then received by the chargeable device 14. Characteristics of the radio frequency signals 17A and 17B may be similar to those of the signals 17A and 17B discussed in FIG. 5.

The signals 17A and 17B travel to the chargeable device 14 via their own paths, respectively. Because the paths taken by the signals 17A and 17B are often different, the time it takes for these signals to travel from the transmitting antennas 17A or 17B to the chargeable device 14 may be different. Therefore, even if the signals 17A and 17B are transmitted by transmitting antennas 12a and 12b with a phase difference of 0 degrees, there may be a phase difference between the signals 17A and 17B when arriving at the chargeable device 14. Such a phase difference varies depending, at least in part, on the lengths of the paths between the transmitting antennas 12a, 12b and the chargeable device 14. The controller 34 may cause the transmitters 12a and 12b to introduce a phase offset between the signals 17A and 17B to compensate for the phase difference introduced by traveling in different paths so that these signals arrive at the chargeable device 14 substantially in phase.

In certain embodiments, the controller 34 is able to track the signal strength of the charging signal at the chargeable device 14. As above described, the chargeable device 14 may comprise a signal power detector 162 and a transmitting antenna 164 (see FIG. 4). The signal power detector 162 detects the signal strength of the charging signal received by the chargeable device 14 and sends a feedback signal indicative of such signal strength via the transmitting antenna 164. The system 31 further comprises a receiving antenna 38 connected to a receiver 36. The receiving antenna 38 and the receiver 36 receive the signal indicative of signal strength at the chargeable device 14, and forward the same signal to the controller 34. As already noted, the signal from the device to the controller may be implemented using light, sound or other means than radio.

In certain embodiments, the appropriate value of the phase offset between the signals 17A and 17B at the transmitting antennas 18a and 18b may be determined by incrementally adjusting the phase offset through a range, and monitoring corresponding signal strength of the charging signal received by the chargeable device. In one embodiment, the radio frequency signal 17B is the same as the radio frequency signal 17A except that there is a phase difference between these signals before these signals get radiated In one embodiment, the feedback signal from the chargeable device 14 is also used to adjust the polarization of the transmitting antennas 18a and 18b such that it aligns with the polarization of the receiving antenna 148 (see FIG. 3). As discussed with regard to FIG. 3, the power transfer between a transmitting antenna and a receiving antenna is maximized when the polarization of both antennas align with each other. The controller 34 incrementally adjusts the polarization of the transmitting antenna 18a by rotating the orientation of the electric field of the electromagnetic wave generated by the transmitting antenna 18a, for example, from 0 to 90 degrees. The feedback signal from the device 14 is monitored to determine at which angle maximum power transfer is achieved. At first the angle may be adjusted in increments such as 10 degrees to find an approximately optimal angle. Once the approximately optimal angle is determined, the angle may be adjusted in increments such as 0.5 degrees to find an angle much closer to the optimal angle. Once the polarization of the transmitting antenna 18a is adjusted to match the polarization of the receiving antenna 148, the same process may be repeated to adjust the polarization of other transmitting antennas such as 18b.

There may be many ways to adjust the polarization of an antenna. In one embodiment, the transmitting antennas 12a and 12b are mechanically rotatable controlled by signals sent by the controller 34. In another embodiment, each of the transmitting antennas 12a and 12b comprises a vertically mounted radiating element and a horizontally mounted radiating element. By incrementally dividing and reversing the voltage applied to the antenna between the vertically mounted element and the horizontally mounted element, the polarization of the antenna may be adjusted from 0 to 90 degrees.

It will be appreciated that the embodiments discussed above of a method of aligning polarization of a transmitting antenna and of the receiving antenna may be incorporated in the embodiment illustrated in FIG. 3.

Figure 8:
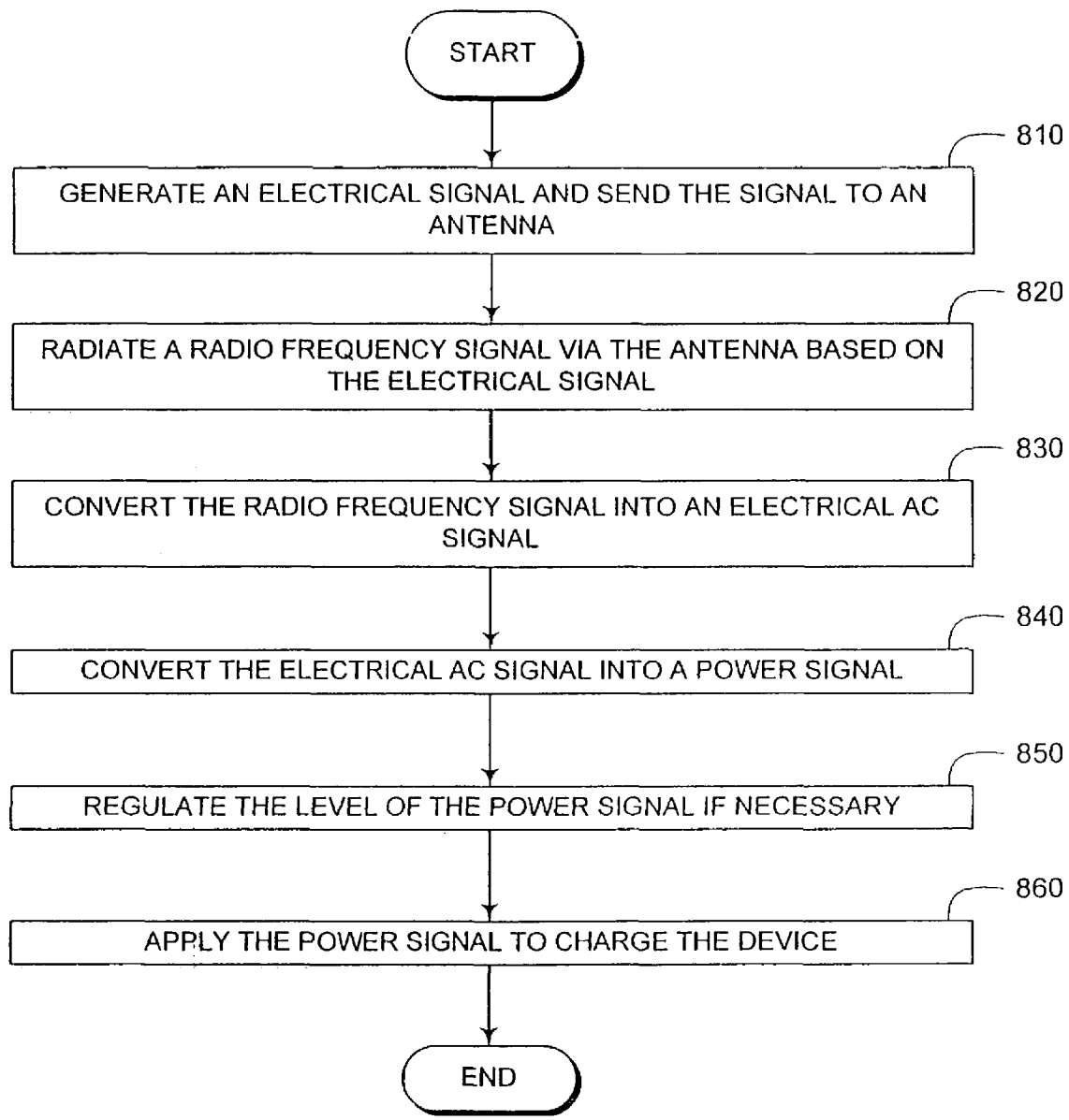
FIG. 8 is a flowchart describing a method of using a radio frequency signal carrying energy to power or charge an electronic device via a wireless link.

FIG. 8 is a flowchart describing a method of using a radio frequency signal carrying energy to power or charge an electronic device via a wireless link. The method is performed using the system for charging an electronic device as described above with regard to FIGS. 1, 3, and 4.

The method starts at a block 810, where the transmitter 12 generates an electrical signal and sends the same to the antenna 18 (see FIG. 1). As discussed in FIG. 1, the antenna 18 may be either omni-directional or directional. Next at a block 820, the antenna 18 receives the electrical signal and radiates a radio frequency signal to a chargeable device 14 (see FIG. 1). The radio frequency signal is discussed above with regard to the FIGS. 2A, 2B, and 2C. The radio frequency signal may be either modulated or substantially unmodulated. The radio frequency signal may be of a single frequency. In one embodiment, the radio frequency signal may be a pure sinusoidal wave signal.

Moving to a block 830, the receiving antenna 148 of the chargeable device 14 receives the radio frequency signal and converts the signal into an electrical AC signal. Next at a block 840, the rectifier 152 converts the electric AC signal into a power signal. The power signal can be a pulsating unidirectional signal or a DC signal suitable for powering the device and/or charging the rechargeable battery, as discussed above in FIG. 4.

Next at a block 850, the voltage regulator 154 regulates the voltage level of the power signal if necessary, as discussed above in FIG. 3. It will be appreciated that block 850 may be removed in certain embodiments. Last at a block 860, the power signal is applied to charge the rechargeable battery 146 of the chargeable device 14, as discussed above in FIG. 3.

Figure 9:
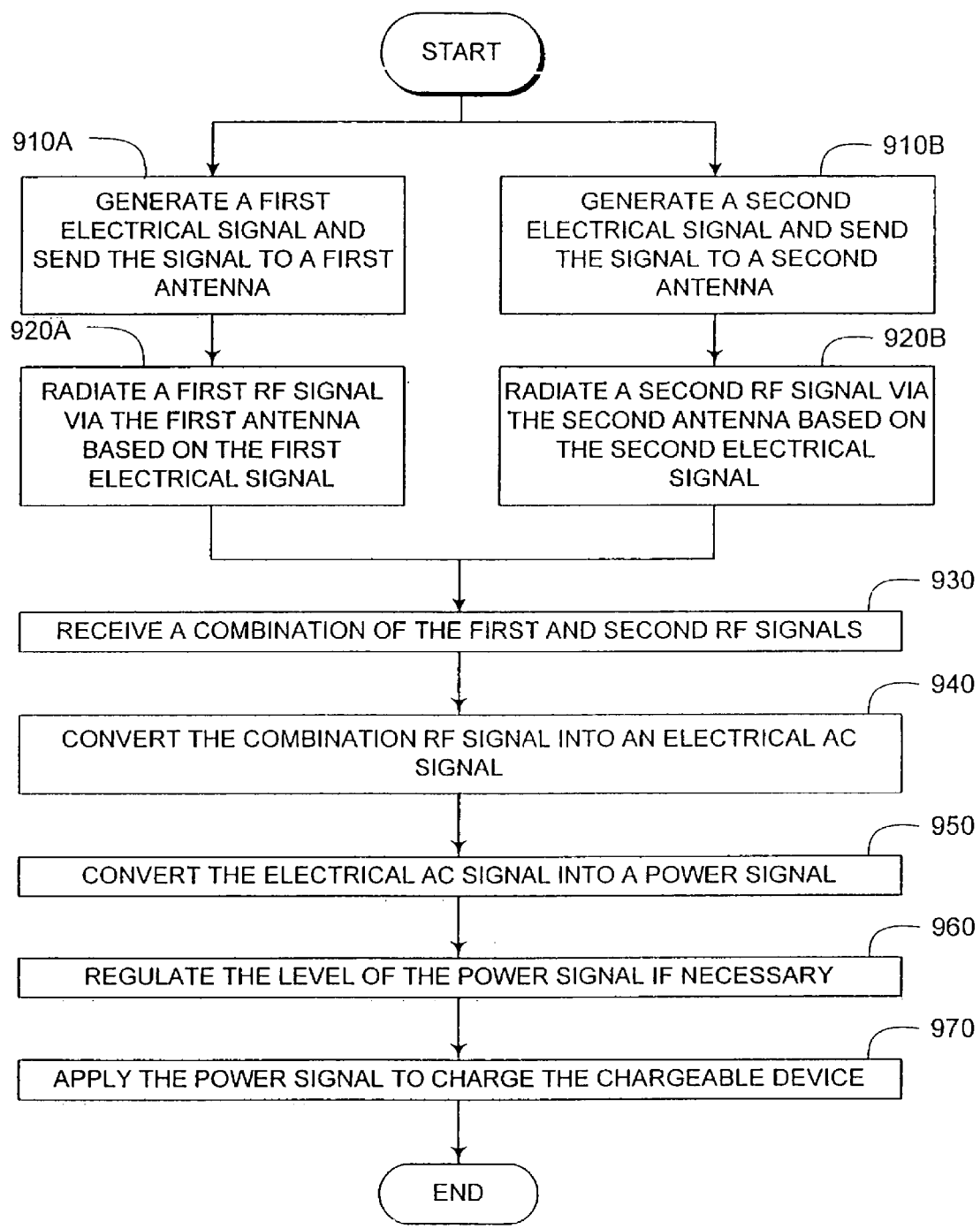
FIG. 9 is a flowchart describing a method of using two radio frequency signals carrying energy to power or charge an electronic device via a wireless link.

FIG. 9 is a flowchart describing a method of using two radio frequency signals carrying energy to power or charge an electronic device via a wireless link. The method is performed using the system for charging an electronic device as described above with regard to FIGS. 5, 6, and 7.

The method starts at block 910A, where the first transmitter 12a generates a first electrical signal and sends the signal to the first antenna 18a. Next at a block 920A, the first antenna 18a receives the first electrical signal and radiates the first radio frequency signal 17A to the chargeable device 14. Similarly, the method provides blocks 910B and 920B, which are preformed substantially concurrently with blocks 910A and 920A. At blocks 910B and 920B, the second transmitter 12b and the second antenna 18b radiates the second radio frequency signal 17B to the chargeable device 14. The transmitters, antennas, and the RF signals are the same as discussed in FIGS. 5, 6, and 7.

Next at a block 930, the chargeable device 14 receives a combination of the first and second RF signals. In Blocks 940, 950, 960, and 970, the received combination RF signal is used to charge the device 14, similarly to the discussion above in FIG. 8.

Figure 10:
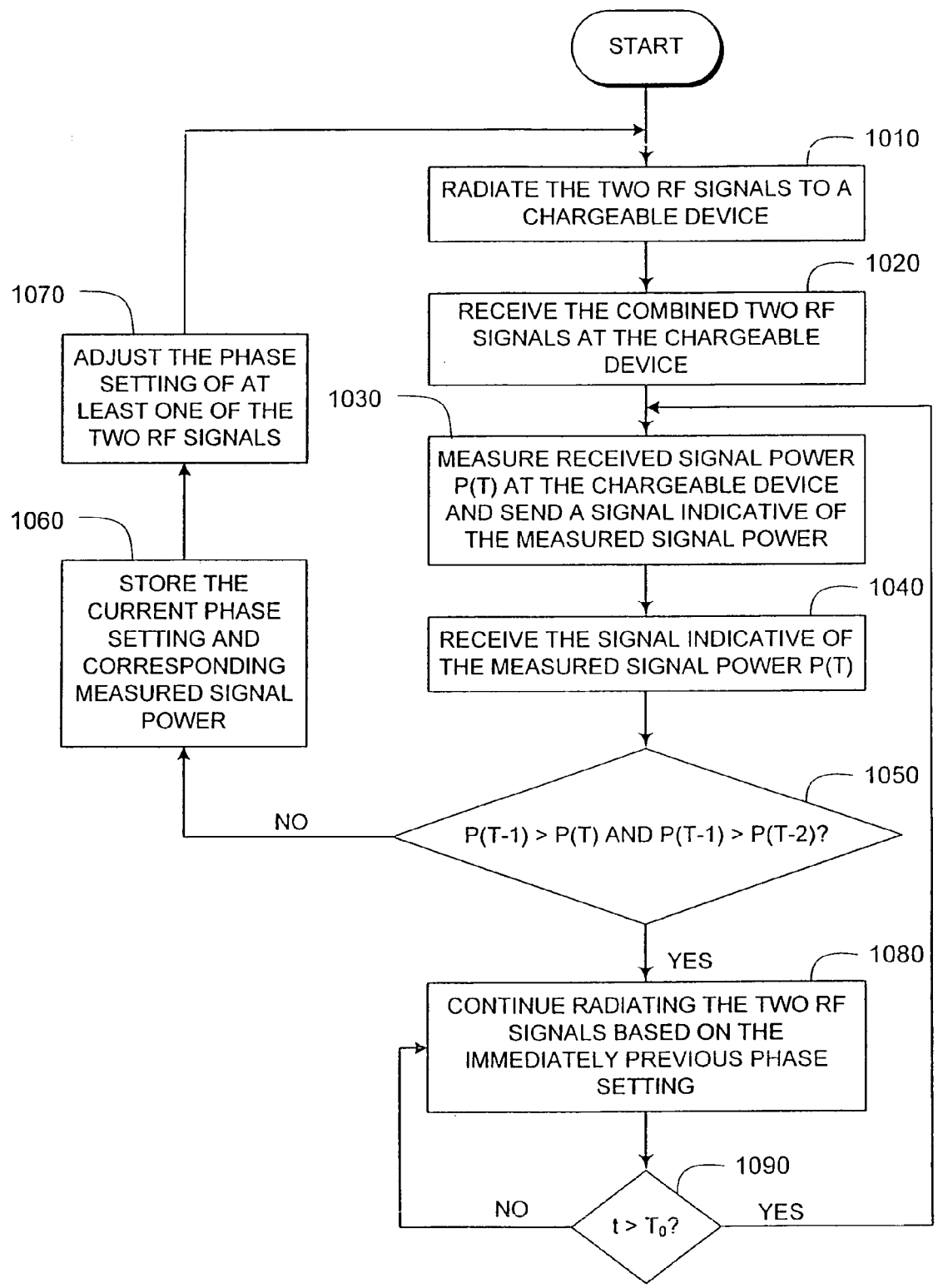
FIG. 10 is a flowchart describing a method of adjusting phase difference between two radio frequency signals such that they arrive at an electronic device in phase.

FIG. 10 is a flowchart describing a method of adjusting phase difference between two radio frequency signals such that they arrive at an electronic device in phase. In the exemplary method, the appropriate value of the phase offset between the signals 17A and 17B at the transmitting antennas 18a and 18b may be determined by incrementally adjusting the phase offset and monitoring corresponding signal strength of the charging signal received by the chargeable device. The phase offset enabling the signals 17A and 17B to arrive at the chargeable device 14 in phase corresponds to the highest or near highest signal strength at the chargeable device 14. In the exemplary embodiment, the method is applied in the system 31 of transmitting two RF signals to charge a chargeable device as illustrated in FIG. 7.

The method starts at a block 1010, where the antennas 18a and 18b receive two electrical signals from transmitters 12a and 12b and radiate two radio frequency signals to the chargeable device 14 (see FIG. 7). At a block 1020, the chargeable device 14 receives the combined two radio frequency signals. Next at a block 1030, a signal power detector 162 detects the received signal power p(T) at the chargeable device 14 (see FIG. 7). The transmitting antenna 164 of the device 14 then sends a feedback signal indicative of the measured signal power to a controller 34. Moving to a block 1040, a receiver 36 receives the feedback signal via a receiving antenna 38 and sends a signal related to the measured signal power to the controller 34. As previously noted, other alternative means than radio may be used to convey this feedback signal.

At a block 1050, the controller 34 determines whether or not the optimal phase offset has been achieved, e.g., whether or not the maximum signal strength of the combined RF signal has been received by the chargeable device 14. The optimal phase offset is the phase offset which causes the two radio frequency signals 18a and 18b to arrive at the chargeable device 14 substantially in phase. In this block 1050, p(T) represents the current power measurement, p(T−1) represents the measurement immediately before p(T), and p(T−2) represents the measurement immediately before p(T−1). The controller 34 will conclude that the optimal phase offset has been achieved during the immediately previous measurement, if the immediately previous power measurement p(T−1) is greater than both of its immediate neighbors in time order, p(T−2) and p(T). In one embodiment, the controller 34 may conclude that the optimal phase offset has been achieved during the immediately previous measurement, if the p(T), either is greater than or equals to, both p(T−2) and p(T). For the initial two measurements, the controller 34 is configured to conclude that the optimal phase offset has not been achieved since at least one of p(T−1) and p(T−2) is not available. For example, p(T−1) and p(T−2) may be assigned a default value of 0 if any of them is not available yet. If the optimal phase offset has been achieved, the method proceeds to a block 1080, where the two transmitting antennas 18a and 18b continue radiating the two radio frequency signals based on the immediately previous phase settings. In certain embodiments, at block 1050, the controller 34 may stop the phase adjustment if the current measured signal power is over a pre-determined or desired value, e.g., a signal power value that may be estimated mathematically.

If at block 1050, the controller 34 determines that p[t−1] is not greater than both p[t] and p[t−2], the method moves to a block 1060. At block 1060, the controller 1060 stores the current phase setting and corresponding measured signal power for later use. Next at a block 1070, the controller adjusts the phase setting for these two radio frequency signals. In one embodiment, the phase of one radio frequency signal keeps constant while the phase of the other radio frequency signal is adjusted. The phase of a radio frequency signal may be increased at increments of, for example, 10 degrees. The increment may be bigger or smaller depending on how accurate the phase adjustment needs to be done.

In certain embodiments, the chargeable device 14 may move while a user moves, therefore making it necessary for the controller 34 to check whether the two radio frequency signals 18a and 18b are in phase from time to time. After the controller 34 finds the proper phase setting and continues radiating the two radio frequency signals at that phase setting as shown in block 1080, the method moves to a block 1080, where the controller 34 checks whether a time period of a predetermined length $T_0$ (e.g., 1, 2, 5, 10 or more minutes) has passed since the controller 34 finishes the last phase adjustment. If the answer is no, the method goes back to block 1080. If the answer is yes, the method moves to block 1030 where the controller 34 starts a new round of phase adjustment.

The foregoing description details certain embodiments of the invention. It will be appreciated, however, that the invention may be practiced in many ways. For example, although a workable method is described here for optimizing the phase and the polarization of the electromagnetic waves at the device receive antenna, there may be many other methods for optimization that are applicable to the present invention without departing from the scope and spirit of the invention. It should be noted that the use of particular terminology when describing certain features or aspects of the invention should not be taken to imply that the terminology is being re-defined herein to be restricted to including any specific characteristics of the features or aspects of the invention with which that terminology is associated. Although the present invention has been described with reference to specific exemplary embodiments, it will be evident that the various modification and changes may be made to these embodiments without departing from the broader spirit of the invention. Accordingly, the written description, including any drawings, is to be regarded in an illustrative sense rather than in a restrictive sense.

What is claimed is:

1. A system configured to transfer power to a power consuming device, the system comprising:
   a transmitter configured to generate a substantially single frequency signal; and
   a transmit antenna having a first polarization and configured to receive the substantially single frequency signal from the transmitter and to generate an electromagnetic signal to transfer power to a receiving antenna of the power consuming device, the receiving antenna having a second polarization, and the first polarization of the transmit antenna being adjusted to match the second polarization of the receiving antenna.

2. The system of claim 1, wherein the orientation of the electric field component of the signal generated by the transmit antenna is substantially matched with the orientation of the receiving antenna.

3. A system configured to transfer power to a power consuming device via a wireless field, the system comprising:
   a first transmitter configured to transmit a first signal via a first antenna for powering or charging the power consuming device; and
   a second transmitter configured to transmit a second signal via a second antenna for powering or charging the power consuming device,
   the combination of the first and second signals from the first transmitter and the second transmitter collectively powering or charging the power consuming device in a way such that the combination of the first and second signals produces more amplitude than either of the first or second signals would produce individually.

4. The system of claim 3, wherein each of the first and second antennas comprises a unidirectional antenna.

5. The system of claim 4, wherein the beamwidth of each directional antenna is between 0.05 and 20 degrees.

6. The system of claim 3, wherein each of the first and second signals comprises a substantially unmodulated RF signal.

7. The system of claim 3, wherein each of the first and second signals comprises a substantially unmodulated magnetic signal.

8. The system of claim 3, wherein each of the first and second signals comprises a substantially single frequency signal.

9. The system of claim 3, wherein each of the first and second signals consists essentially of a substantially single frequency signal.

10. The system of claim 3, wherein each of the first and second signals consists of a substantially single frequency signal. pg,25

11. The system of claim 10, wherein the single frequency is between 30 MHz and 3 GHz.

12. The system of claim 10, wherein the single frequency is between 88 MHz and 108 MHz.

13. The system of claim 3, wherein each of the first and second signals comprises a sinusoidal signal.

14. The system of claim 3, wherein each of the first and second signals consists essentially of a sinusoidal signal.

15. The system of claim 3, wherein each of the first and second signals consists of a sinusoidal signal.

16. The system of claim 3, wherein each of the first and second signals comprises a signal that is substantially free of information.

17. The system of claim 3, wherein each of the first and second signals comprises substantially a carrier signal.

18. The system of claim 3, wherein the power consuming device comprises at least one of the following portable devices: a media player, a personal data assistant, a portable computer, a mobile or cellular phone, a clock, and an electronic display.

19. A system configured to transfer power to a power consuming device via a wireless field, the system comprising:
a first transmitter configured to transmit a first signal via a first antenna for powering or charging the power consuming device; and
a second transmitter configured to transmit a second signal via a second antenna for powering or charging the power consuming device,
the combination of the first and second signals from the first transmitter and the second transmitter collectively powering or charging the power consuming device, and the amplitude of the combination of the first and second signals is higher than the amplitude of either one of the first and second signals.

20. A system configured to transfer power to a power consuming device via a wireless field, the system comprising:
a first transmitter configured to transmit a first signal via a first antenna for powering or charging the power consuming device; and
a second transmitter configured to transmit a second signal via a second antenna for powering or charging the power consuming device,
the combination of the first and second signals from the first transmitter and the second transmitter collectively powering or charging the power consuming device, the phase difference between the first signal and the second signal at the location of the power consuming device being substantially 0 degrees. pg,26

21. The system of claim 20, wherein the power consuming device further comprises a charge receiving antenna, the system further comprising a controller configured to adjust the phase difference between the first and second signals such that the phase difference between the first and second signals is substantially 0 degrees at the location of the charge receiving antenna.

22. The system of claim 21, wherein the controller adjusts the phase difference based on a feedback signal sent by the power consuming device, the feedback signal being indicative of the power of the combination of the first and second signals.

23. The system of claim 3, wherein the power consuming device further comprises a charge receiving antenna.

24. A system configured to transfer power to a power consuming device via a wireless field, the system comprising:
a first transmitter configured to transmit a first signal via a first antenna for powering or charging the power consuming device; and
a second transmitter configured to transmit a second signal via a second antenna for powering or charging the power consuming device,
the combination of the first and second signals collectively powering or charging the power consuming device, the power consuming device further comprising a charge receiving antenna, and the controller being configured to adjust a polarization of the first and second antenna to substantially match a polarization of the charge receiving antenna.

25. The system of claim 24, wherein the polarization of each of the first and second antenna is indicative of the orientation of the electric field component of each of the first and second signals.

26. A method of transferring power to a power consuming device via a wireless link, the method comprising:
generating a substantially unmodulated signal;
generating a substantially unmodulated electromagnetic signal to power or charge the power consuming device via a transmit antenna based on the substantially unmodulated signal, the power consuming device further comprising a charge receiving antenna, and
adjusting a polarization of the transmit antenna to match a polarization of the charge receiving antenna. pg,27

27. A method of transferring power to a power consuming device via a wireless link, the method comprising: transmitting a first signal via a first antenna to a power consuming device;
transmitting a second signal via a second antenna to the power consuming device; and
powering or charging the power consuming device with power delivered by the combination of the first and second signals, the combination having a higher amplitude than either of the first or second signals individually.

28. A method of transferring power to a power consuming device via a wireless link, the method comprising:
transmitting a first signal via a first antenna to a power consuming device;
transmitting a second signal via a second antenna to the power consuming device; and powering or charging the power consuming device with power delivered by the combination of the first and second signals; and
combining the first and second signals to charge the power consuming device using the combination of the first and second signals, the combination having an amount of power that is greater than either one of the first and second signals individually.

29. A method of transferring power to a power consuming device via a wireless link, the method comprising: transmitting a first signal via a first antenna to a power consuming device;
transmitting a second signal via a second antenna to the power consuming device;

powering or charging the power consuming device with power delivered by the combination of the first and second signals; and adjusting the phase difference between the first and second signals such that the phase difference between the first and second signals is substantially 0 degrees at the location of the power consuming device.

30. The method of claim 27, wherein each of the first and second antennas comprises a directional antenna.

31. The method of claim 27, wherein each of the first and second signal comprises a sinusoidal wave.

32. The method of claim 27, wherein each of the first and second signal comprises a substantially unmodulated signal.

33. The method of claim 32, wherein the substantially unmodulated signal consists of a substantially single frequency signal. pg,28

34. A system for transmitting wireless power, comprising:
a transmitter configured to generate a signal;
an antenna configured to receive the signal from the transmitter and generate an electromagnetic signal;
a receiver that receives a feedback signal from a power consuming device, the feedback signal being indicative of measured signal power in the power consuming device; and
a controller configured to adjust an amount of power transmitted based on the feedback signal.

35. A system as in claim 34, wherein the controller adjusts an amount of power in either an upward or a downward direction in response to the feedback signal.

36. A system as in claim 35, wherein the controller determines whether an optimal phase offset has been achieved.

37. A system as in claim 35, wherein the controller determines a phase offset between the transmitter and a signal generated by another transmitter.

38. A system as in claim 37 wherein the controller changes the transmitting to adjust the phase offset between the transmitter and the another transmitter.

39. A system as in claim 38, wherein the changing comprises determining a power measurement at a current time, and comparing the power measurement with a previous time.

40. A system as in claim 34, wherein the controller compares a power measurement at a current time with a power measurement at a previous time, in order to determine how to adjust the amount of power.

41. A system as in claim 40 wherein the controller reduces an amount of power which is transmitted.

42. A system as in claim 34, wherein the controller changes a transmission to change a phase between the transmitter and a signal generated by another transmitter.

43. A system as in claim 42, wherein the controller adjusts phase setting for the signals.

44. A system as in claim 42, wherein the controller stores of phase value, and changes the phase value in increments.

45. The system of claim 34, wherein the transmitter transmits a substantially pure sinusoidal wave. pg,29

46. A system configured to transfer power to a power consuming device, the system comprising:
a transmitter configured to generate a substantially single frequency signal;
a transmit antenna configured to receive the signal from the transmitter and generate an electromagnetic signal to transfer power to a receiving antenna of the power consuming device; and
a controller configured to adjust the polarization of the transmit antenna to match a polarization of the receiving antenna.

47. A system configured to receive power via a wireless link, the system comprising:
a receiver that receives power wirelessly from both a first transmitter that is configured to transmit a first signal via a first antenna for powering or charging the power consuming device, and via a second transmitter that is configured to transmit a second signal via a second antenna for powering or charging the power consuming device
such that a combination of the first and second signals from the first transmitter and the second transmitter collectively power or charge the power consuming device, and the combination of the first and second signals produces more amplitude than either the first or second signal would produce individually.

48. The system of claim 47, wherein each of the first and second signals comprises a substantially unmodulated RF signal.

49. The system of claim 47, wherein each of the first and second signals comprises a substantially unmodulated magnetic signal.

50. The system of claim 47, wherein each of the first and second signals comprises a substantially single frequency signal.

51. The system of claim 50, wherein the single frequency is between 30 MHz and 3 GHz.

52. The system of claim 50, wherein the single frequency is between 88 MHz and 108 MHz.

53. The system of claim 50, wherein each of the first and second signals comprises a signal that is substantially free of information.

54. A system configured to receive power via a wireless fields, the system comprising:
a receiver that receives from both a first transmitter configured to transmit a first signal via a first antenna for powering or charging the power consuming device and from a second transmitter configured to transmit a second signal via a second antenna for powering or charging the power consuming device,
the receiver receiving a combination of the first and second signals from the first transmitter and the second transmitter, and an amplitude of the combination of the first and second signals is higher than the amplitude of either one of the first and second signals.

55. A system configured to receive power from a power consuming device via a wireless field, the system comprising:
a receiver configured to receive a combined signal from a first transmitter that is configured to transmit a first signal via a first antenna for powering or charging the power consuming device and a second transmitter that is configured to transmit a second signal via a second antenna for powering or charging the power consuming device such that a combination of the first and second signals from the first transmitter and the second transmitter collectively power or charge the power consuming device,
the receiver configured to receive the signals such that a phase difference between the first signal and the second signal at the location of the power consuming device is substantially 0 degrees. pg,30

56. The system of claim 55, wherein the receiver further comprises a transmitter that sends a signal indicative of the phase difference to at least one of the transmitters.

57. The system of claim 56, wherein the signal is indicative of the power of the combination of the first and second signals.

58. An apparatus for transferring power to a power consuming device via a wireless link, the apparatus comprising:
means for generating a substantially unmodulated signal;

means for generating a substantially unmodulated electromagnetic signal to power or charge the power consuming device via a transmit antenna based on the substantially unmodulated signal, the power consuming device further comprising a charge receiving antenna, and means for adjusting a polarization of the transmit antenna to match a polarization of the charge receiving antenna.

59. An apparatus for transferring power to a power consuming device via a wireless link, the apparatus comprising:

means for transmitting a first signal via a first antenna to a power consuming device;

means for transmitting a second signal via a second antenna to the power consuming device; and means for powering or charging the power consuming device with power delivered by the combination of the first and second signals, the combination having a higher amplitude than either of the first or second signals individually.

60. An apparatus for transferring power to a power consuming device via a wireless link, the apparatus comprising:

means for transmitting a first signal via a first antenna to a power consuming device; means for transmitting a second signal via a second antenna to the power consuming device;

means for powering or charging the power consuming device with power delivered by the combination of the first and second signals; and means for adjusting the phase difference between the first and second signals such that the phase difference between the first and second signals is substantially 0 degrees at the location of the power consuming device.

61. A method for transferring power to a power consuming device via a wireless field, the method comprising:

transmitting a first signal via a first antenna for powering or charging the power consuming device; and transmitting a second signal via a second antenna for powering or charging the power consuming device, the combination of the first and second signals collectively powering or charging the power consuming device, the power consuming device further comprising a charge receiving antenna; and adjusting a polarization of the first and second antenna to substantially match a polarization of the charge receiving antenna. pg.,31

62. An apparatus for transferring power to a power consuming device via a wireless field, the apparatus comprising:

means for transmitting a first signal via a first antenna for powering or charging the power consuming device; and means for transmitting a second signal via a second antenna for powering or charging the power consuming device, the combination of the first and second signals collectively powering or charging the power consuming device, the power consuming device further comprising a charge receiving antenna; and means for adjusting a polarization of the first and second antenna to substantially match a polarization of the charge receiving antenna.

63. A method for transmitting power via a wireless field to a power consuming device, the method comprising:

generating a driving signal;

generating an electromagnetic signal based on the driving signal;

receiving a feedback signal from the power consuming device, the feedback signal being indicative of measured signal power in the power consuming device; and adjusting an amount of power transmitted based on the feedback signal.

64. An apparatus for transmitting power via a wireless field to a power consuming device, the apparatus comprising:

means for generating a driving signal;

means for generating an electromagnetic signal based on the driving signal;

means for receiving a feedback signal from the power consuming device, the feedback signal being indicative of measured signal power in the power consuming device; and means for adjusting an amount of power transmitted based on the feedback signal.

65. A method of receiving power via a wireless field, the method comprising:

receiving a first signal transmitted via a first antenna for powering or charging the power consuming device;

receiving a second signal transmitted via a second antenna for powering or charging the power consuming device;

receiving a combination of the first and second such that an amplitude of the combination of the first and second signals is higher than the amplitude of either one of the first and second signals.

66. An apparatus for receiving power via a wireless field, the apparatus comprising:

means for receiving a first signal transmitted via a first antenna for powering or charging the power consuming device;

means for receiving a second signal transmitted via a second antenna for powering or charging the power consuming device;

means for receiving a combination of the first and second such that an amplitude of the combination of the first and second signals is higher than the amplitude of either one of the first and second signals. pg.,32

67. A method of receiving power from a power consuming device via a wireless field, the method comprising:

receiving a combined signal from a first transmitter that is configured to transmit a first signal via a first antenna for powering or charging the power consuming device and a second transmitter that configured to transmit a second signal via a second antenna for powering or charging the power consuming device such that a combination of the first and second signals from the first transmitter and the second transmitter collectively power or charge the power consuming device, the receiver configured to receive the signals such that a phase difference between the first signal and the second signal at the location of the power consuming device is substantially 0 degrees.

68. An apparatus for receiving power from a power consuming device via a wireless field, the apparatus comprising:

means for receiving a combined signal from a first transmitter that is configured to transmit a first signal via a first antenna for powering or charging the power consuming device and a second transmitter that configured to transmit a second signal via a second antenna for powering or charging the power consuming device such that a combination of the first and second signals from the first transmitter and the second transmitter collectively power or charge the power consuming device, the receiver configured to receive the signals such that a phase difference between the first signal and the second signal at the location of the power consuming device is substantially 0 degrees; and means for adjusting at least one parameter of the means for receiving.

* * * * *